US012300267B2

(12) United States Patent
Nam et al.

(10) Patent No.: US 12,300,267 B2
(45) Date of Patent: May 13, 2025

(54) METHOD OF MATCHING SOUND SOURCE FOR EACH OBJECT INCLUDED IN VIDEO, AND COMPUTING DEVICE FOR PERFORMING THE SAME

(71) Applicant: SAMSUNG ELECTRONICS CO., LTD., Suwon-si (KR)

(72) Inventors: Woohyun Nam, Suwon-si (KR); Kyungrae Kim, Suwon-si (KR); Jungkyu Kim, Suwon-si (KR); Sangchul Ko, Suwon-si (KR); Yoonjae Son, Suwon-si (KR); Tammy Lee, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 9 days.

(21) Appl. No.: 18/225,406

(22) Filed: Jul. 24, 2023

(65) Prior Publication Data
US 2024/0105205 A1    Mar. 28, 2024

Related U.S. Application Data

(63) Continuation of application No. PCT/KR2023/008856, filed on Jun. 26, 2023.

(30) Foreign Application Priority Data

Jun. 30, 2022 (KR) .................. 10-2022-0080857
Sep. 22, 2022 (KR) .................. 10-2022-0120299

(51) Int. Cl.
G10L 25/57   (2013.01)
G10L 15/25   (2013.01)
G11B 27/031  (2006.01)

(52) U.S. Cl.
CPC ............. *G10L 25/57* (2013.01); *G10L 15/25* (2013.01); *G11B 27/031* (2013.01)

(58) Field of Classification Search
CPC ........ G10L 25/57; G10L 15/25; G11B 27/031
See application file for complete search history.

(56) References Cited

U.S. PATENT DOCUMENTS

| 7,174,293 B2 | 2/2007 | Kenyon et al. |
| 9,621,122 B2 | 4/2017 | Kim et al. |

(Continued)

FOREIGN PATENT DOCUMENTS

| JP | 2006-128801 A | 5/2006 |
| JP | 2014-195267 A | 10/2014 |

(Continued)

OTHER PUBLICATIONS

International Search Report & Written Opinion (PCT/ISA/210 & PCT/ISA/237) dated Sep. 19, 2023 issued by the International Searching Authority in International Application No. PCT/KR2023/008856.

(Continued)

*Primary Examiner* — Mishawn N. Hunter
(74) *Attorney, Agent, or Firm* — Sughrue Mion, PLLC

(57) ABSTRACT

A method of matching a voice for each object included in a video, includes: separating a plurality of voices in a video; determining a dissimilarity between the plurality of voices; selecting a partial duration in an entire duration of the video as a matching duration, based on the dissimilarity between the plurality of voices; matching, within the matching duration, the plurality of voices with a plurality of objects in the video respectively, based on mouth movements of the plurality of objects; and matching the plurality of voices with the plurality of objects respectively in the entire duration of the video, based on results of the matching between the (Continued)

plurality of voices and the plurality of objects within the matching duration.

20 Claims, 20 Drawing Sheets

(56) References Cited

U.S. PATENT DOCUMENTS

| | | | |
|---|---|---|---|
| 10,153,002 | B2 | 12/2018 | Anand et al. |
| 10,304,458 | B1 | 5/2019 | Woo |
| 10,877,723 | B2 | 12/2020 | Rakshit |
| 11,277,702 | B2 | 3/2022 | Jung et al. |
| 2007/0048697 | A1* | 3/2007 | Du .................. G09B 19/04 434/156 |
| 2017/0301371 | A1 | 10/2017 | Anand et al. |
| 2018/0174600 | A1* | 6/2018 | Chaudhuri ....... H04N 21/44008 |
| 2020/0288255 | A1 | 9/2020 | Jung et al. |
| 2022/0138472 | A1* | 5/2022 | Mittal .................. G06N 3/045 382/181 |

FOREIGN PATENT DOCUMENTS

| | | |
|---|---|---|
| JP | 2018-13742 A | 1/2018 |
| KR | 10-2009-0043203 A | 5/2009 |
| KR | 10-2014-0084463 A | 7/2014 |
| KR | 10-2014-0096774 A | 8/2014 |
| KR | 10-2016-0047822 A | 5/2016 |
| KR | 10-2064077 B1 | 1/2020 |
| KR | 10-2020-0083685 A | 7/2020 |
| KR | 10-2020-0107757 A | 9/2020 |

OTHER PUBLICATIONS

Gao, Ruohan et al., "VISUALVOICE: Audio-Visual Speech Separation with Cross-Modal Consistency", In Proceedings of the IEEE Conference on Computer Vision and Pattern Recognition 9CVPR), 2021, arXiv:2101.03149v2 [cs.CV], Apr. 6, 2021. (11 pages total).
Nasr, Seham et al., "Text-independent Speaker Recognition using Deep Neural Networks", 2021 International Conference on Information Technology (ICIT), Jul. 2021. (6 pages total).
Schroff, Florian et al., "FaceNet: A Unified Embedding for Face Recognition and Clustering", CVF, Mar. 2015. (9 pages total).
Martinez, Brais et al., "Lipreading Using Temporal Convolutional Networks", arXiv:2001.08702v1 [cs.CV], Jan. 23, 2020. (6 pages total).
Communication issued Feb. 21, 2025 by the European Patent Office in European Patent Application No. 23831842.2.

\* cited by examiner

FIG. 17

|  | Object#1 | | Object#2 | |
|---|---|---|---|---|
|  | MINIMUM ERROR DURATION | MAXIMUM ERROR DURATION | MINIMUM ERROR DURATION | MAXIMUM ERROR DURATION |
| Voice#1 | 0.6134 | 0.9861 | 0.3641 | 0.0704 |
| Voice#2 | 0.3141 | 0.0051 | 0.6001 | 0.9504 |

METHOD OF MATCHING SOUND SOURCE FOR EACH OBJECT INCLUDED IN VIDEO, AND COMPUTING DEVICE FOR PERFORMING THE SAME

CROSS-REFERENCE TO RELATED APPLICATIONS

This application is a by-pass continuation application of International Application No. PCT/KR2023/008856, filed on Jun. 26, 2023, which is based on and claims priority to Korean Patent Application Nos. 10-2022-0080857, filed on Jun. 30, 2022, and 10-2022-0120299, filed on Sep. 22, 2022, in the Korean Intellectual Property Office, the disclosures of which are incorporated by reference herein their entireties.

BACKGROUND

1. Field

The disclosure relates to a method of matching sound sources respectively corresponding to objects in a video in which a plurality of objects appear, and controlling reproduction of the video according to matching results, and a computing device for performing the same.

2. Description of Related Art

As environments of watching videos are becoming diversified, a number of methods by which viewers interact with the videos is increasing. For example, when a video is reproduced through a screen where a touch input is possible, such as a smart phone or a tablet personal computer (PC), a viewer may fix a focus of the video on a specific character by enlarging a partial region (a region where the specific character appears) of the video through a touch input.

As such, when a focus of a video is fixed on a specific character through an input of a user, such focus may also be applied to an audio output, which corresponds to the specific character, to provide intuitive feedback to the user. In this regard, it may be required to match sound sources (voices) of the video with characters appearing in the video.

SUMMARY

According to an embodiment of the disclosure, a method of matching a voice for each object included in a video, includes separating a plurality of voices included in a video, determining dissimilarity between the plurality of voices, selecting a partial duration of an entire duration of the video as a matching duration, based on the dissimilarity between the plurality of voices, matching the plurality of voices with a plurality of objects included in the video respectively, based on mouth movements of the plurality of objects, within the matching duration, and matching the plurality of voices with the plurality of objects respectively in the entire duration of the video, according to results of the matching between the plurality of voices and the plurality of objects within the matching duration.

According to an embodiment of the disclosure, a computing device includes an input/output interface configured to display a screen where a video is reproduced, and receive an input from a user, a memory storing a program for matching an object and a voice, and a processor, wherein the processor is configured to execute the program to separate a plurality of voices included in the video, determine dissimilarity between the plurality of voices, select a partial duration of an entire duration of the video as a matching duration, based on the dissimilarity between the plurality of voices, match the plurality of voices with a plurality of objects included in the video respectively, based on mouth movements of the plurality of objects, within the matching duration, and match the plurality of voices with the plurality of objects respectively in the entire duration of the video, according to results of the matching between the plurality of voices and the plurality of objects within the matching duration.

According to an embodiment of the disclosure, a computer-readable recording medium has recorded thereon a program for executing an embodiment of the disclosure of the method, on a computer.

According to an embodiment of the disclosure, a computer program is stored in a computer-readable medium to perform, on a computer, an embodiment of the disclosure of the method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 is a table for describing improvement in matching accuracy when matching between an object and a sound source is performed within a selected matching duration, according to an embodiment of the disclosure.

DETAILED DESCRIPTION

Figure 1:
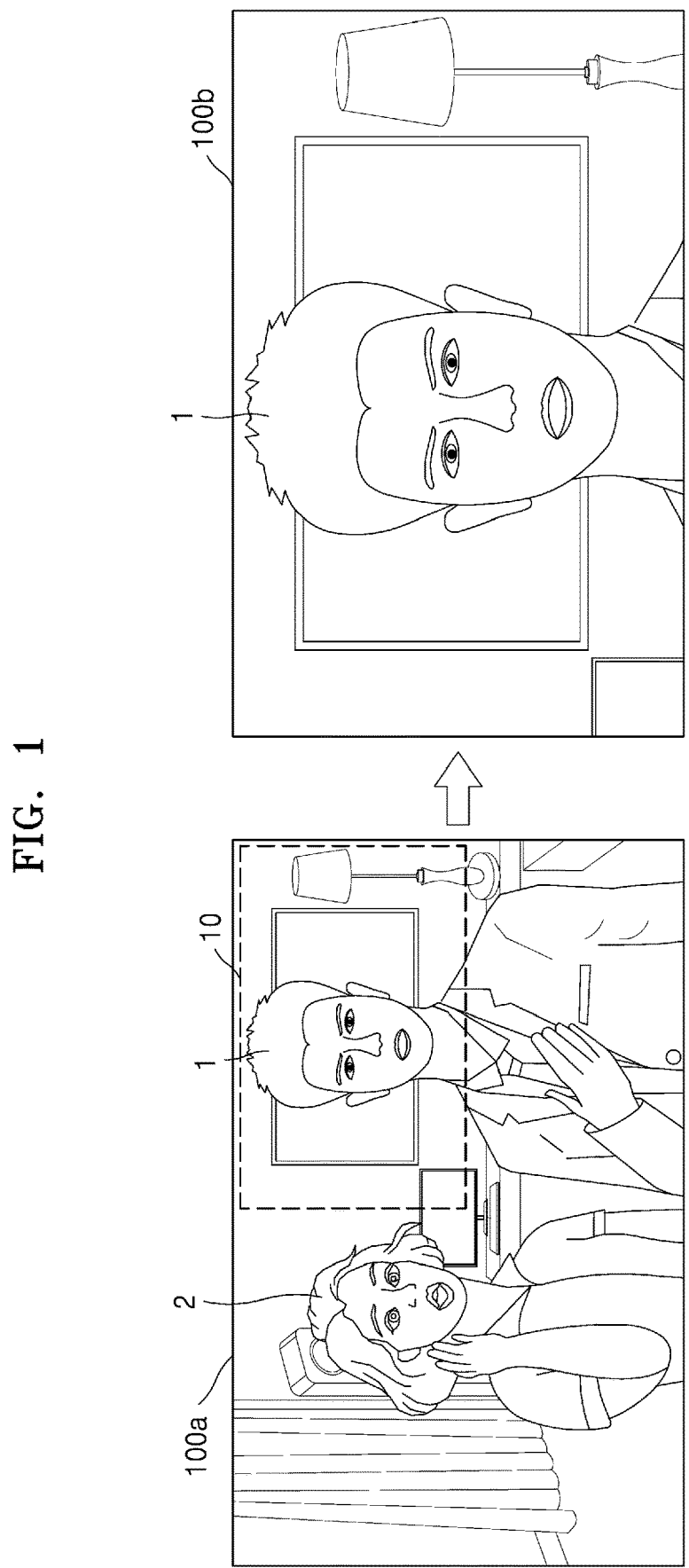
FIG. 1 is a diagram for describing a situation in which a sound source is matched for each object included in a video, and reproduction of the video is controlled according to matching results, according to an embodiment of the disclosure.

While describing the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter. Terms used below are defined in consideration of functions in the disclosure, and may have different meanings according to an intention of a user or operator, customs, or the like. Therefore, the terms used herein have to be defined based on the meaning of the terms together with the description throughout the specification.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of an embodiment of the disclosure and the accompanying drawings. However, the disclosure is not limited to an embodiment of the disclosure described below, and may be implemented in various forms. An embodiment of the disclosure are provided to fully convey the disclosure and fully inform one of ordinary skill in the art of the scope of the disclosure. An embodiment of the disclosure may be defined according to claims. Throughout the specification, like reference numerals denote like elements. While describing an embodiment of the disclosure, when it is determined that detailed descriptions about a related function or configuration may unnecessarily obscure the gist of the disclosure, the detailed descriptions thereof are omitted. Terms used below are defined in consideration of functions in the disclosure, and may have different meanings according to an intention of a user or operator, customs, or the like. Therefore, the terms used herein have to be defined based on the meaning of the terms together with the description throughout the specification.

According to an embodiment of the disclosure, combinations of blocks in flowcharts or process flow diagrams may be performed by computer program instructions. These computer program instructions may be loaded into a processor of a general-purpose computer, special purpose computer, or other programmable data processing apparatus, and the instructions, which are executed via the processor of the computer or other programmable data processing apparatus, may generate means for implementing the functions specified in the flowchart block(s). The computer program instructions may be stored in a computer-executable or computer-readable memory capable of directing a computer or another programmable data processing apparatus to implement a function in a particular manner, and the instructions stored in the computer-executable or computer-readable memory may also be capable of producing manufacturing items containing instruction units for performing the functions described in the flowchart block(s). The computer program instructions may be loaded into a computer or another programmable data processing apparatus.

In addition, each block of a flowchart may represent a portion of a module, segment, or code that includes one or more executable instructions for executing specified logical function(s). According to an embodiment of the disclosure, functions in blocks may be executed out of order. For example, two blocks shown in succession may in fact be executed substantially concurrently or in the reverse order, depending upon the functionality involved.

Throughout the disclosure, the expression "at least one of a, b or c" indicates only a, only b, only c, both a and b, both a and c, both b and c, or all of a, b, and c.

The term "unit" or "-er/or" in an embodiment of the disclosure may indicate a software component or hardware component such as a field-programmable gate array (FPGA) or an application-specific integrated circuit (ASIC), and perform a specific function. The term "unit" or "-er/or" is not limited to software or hardware. The "unit" or "-er/or" may be formed so as to be in an addressable storage medium, or may be formed so as to operate one or more processors. According to an embodiment of the disclosure, the term "unit" or "-er/or" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. Functions provided through specific components or specific "units" or "-ers/ors" may be combined to reduce the numbers thereof or divided into additional components. Also, in an embodiment of the disclosure, the "unit" or "-er/or" may include at least one processor.

Hereinafter, an embodiment of the disclosure will be described in detail with reference to accompanying drawings.

FIG. 1 is a diagram for describing a situation in which a sound source is matched for each object included in a video, and reproduction of the video is controlled according to matching results, according to an embodiment of the disclosure.

A first screen 100a of FIG. 1 corresponds to one scene of a video being reproduced, and a second screen 100b is an enlarged image of a partial region 10 of the first screen 100a. There are two characters 1 and 2 in the first screen 100a, and hereinafter, characters appearing in the video will be referred to as 'objects' (included) in the video.

When a first object 1 and a second object 2 are both speaking in the video, voices of the first and second objects 1 and 2 will be mixed and output. Hereinafter, a voice and a sound source are used in a same meaning.

The disclosure is to emphasize and output the voice of the first object 1, when the second screen 100b is displayed as the partial region 10 is enlarged from the first screen 100a, as shown in FIG. 1. In this regard, sound sources and objects included in the video need to be matched with each other. Accordingly, a method of matching a corresponding sound source for each object included in a video will be described in detail below, and then an embodiment of the disclosure of controlling reproduction of the video based on results of the matching will be described.

Figure 2:
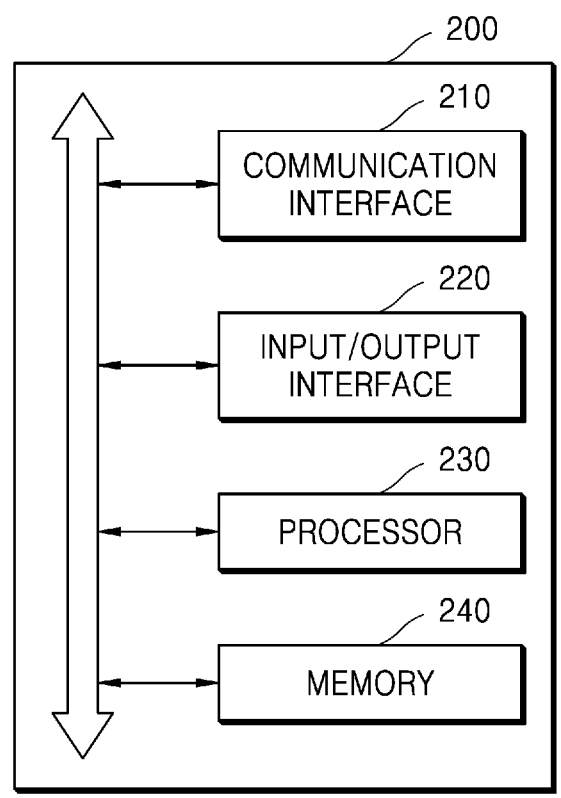
FIG. 2 is a block diagram of a configuration of a computing device for matching a sound source for each object included in a video, and controlling reproduction of the video according to matching results, according to an embodiment of the disclosure.

FIG. 2 is a block diagram of a configuration of a computing device for matching a sound source for each object included in a video, and controlling reproduction of the video according to matching results, according to an embodiment of the disclosure.

In FIG. 2, a computing device 200 shown may be a display device (e.g., a smart phone or a tablet personal computer (PC)) reproducing a video, or a separate server connected to a display device through wired or wireless communication. A method of matching a sound source for each of a plurality of objects included in a video, according to an embodiment of the disclosure, may be performed by a display device reproducing a video, performed by a separate server connected to a display device, or commonly performed by a display device and a server (two devices divide and perform processes included in the method).

Hereinafter, for convenience of description, it is assumed that the computing device 200 of FIG. 2 is a display device reproducing a video, and performs a method of matching a sound source for each of a plurality of objects included in the video, according to an embodiment of the disclosure. However, as described above, an embodiment of the disclosure is not limited thereto, and it is obvious that there is a separate server connected to the display device and the server may perform some or all of processes. Thus, it should be interpreted that, from among operations performed by the computing device 200 according to an embodiment of the disclosure described below, operations other than an operation of displaying an image on a screen may be performed by a separate computing device, such as a server, even when there is no special descriptions.

Referring to FIG. 2, the computing device 200 according to an embodiment of the disclosure may include a communication interface 210, an input/output interface 220, a processor 230, and a memory 240. However, components of the computing device 200 are not limited thereto, and the computing device 200 may include more or fewer components than those described above. According to an embodiment of the disclosure, some or all of the communication interface 210, the input/output interface 220, the processor 230, and the memory 240 may be implemented in the form of one chip, and the processor 230 may include one or more processors.

The communication interface 210 is a component for transmitting/receiving signals (a control command and data) to/from an external device via wires or wirelessly, and may include a communication chipset supporting various communication protocols. The communication interface 210 may receive an external signal and output the same to the processor 230, or may transmit a signal output from the processor 230 to the outside.

The input/output interface 220 may include an input interface (e.g., a touch screen, a hard button, or a microphone) for receiving a control command or information from a user, and an output interface (e.g., a display panel or a speaker) for displaying a state of the computing device 200 or a result of performing an operation according to control by the user. According to an embodiment of the disclosure, the input/output interface 220 may display a video being reproduced, and receive, from the user, an input of enlarging a partial region of the video or an input of selecting a specific object included in the video.

The processor 230 is configured to control a series of operations enabling the computing device 200 to operate according to an embodiment of the disclosure described below, and may include one or more processors. In this case, the one or more processors may be a general-purpose processor such as a central processing unit (CPU), an application processor (AP), or a digital signal processor (DSP), a dedicated graphics processor such as a graphics processing unit (GPU) or a vision processing unit (VPU), or a dedicated AI processor such as a neural processing unit (NPU). For example, when the one or more processors are a dedicated artificial intelligence (AI) processor, the dedicated AI processor may be designed with a hardware structure specialized for processing a specific AI model.

The processor 230 may record data in the memory 240 or read data stored in the memory 240, and in particular, may process data according to a pre-defined operating rule or AI model by executing a program stored in the memory 240. Accordingly, the processor 230 may perform operations described in an embodiment of the disclosure below, and it may be deemed that operations described to be performed by the computing device 200 in an embodiment of the disclosure below are performed by the processor 230 unless described otherwise.

The memory 240 is configured to store various programs or data, and may include a storage medium, such as a read-only memory (ROM), a random access memory (RAM), a hard disk, a CD-ROM, or a DVD, or a combination of storage media. The memory 240 may not be provided separately, and may be included in the processor 230. The memory 240 may be configured as a volatile memory, a nonvolatile memory, or a combination of a volatile memory and a nonvolatile memory. The memory 240 may store a program for performing operations according to an embodiment of the disclosure described below. The memory 240 may provide, to the processor 230, stored data according to a request of the processor 230.

Hereinafter, an embodiment of the disclosure, in which the computing device 200 matches a sound source for each of a plurality of objects included in a video, and controls reproduction of the video according to a result of the matching, will be described in detail.

Figure 3:
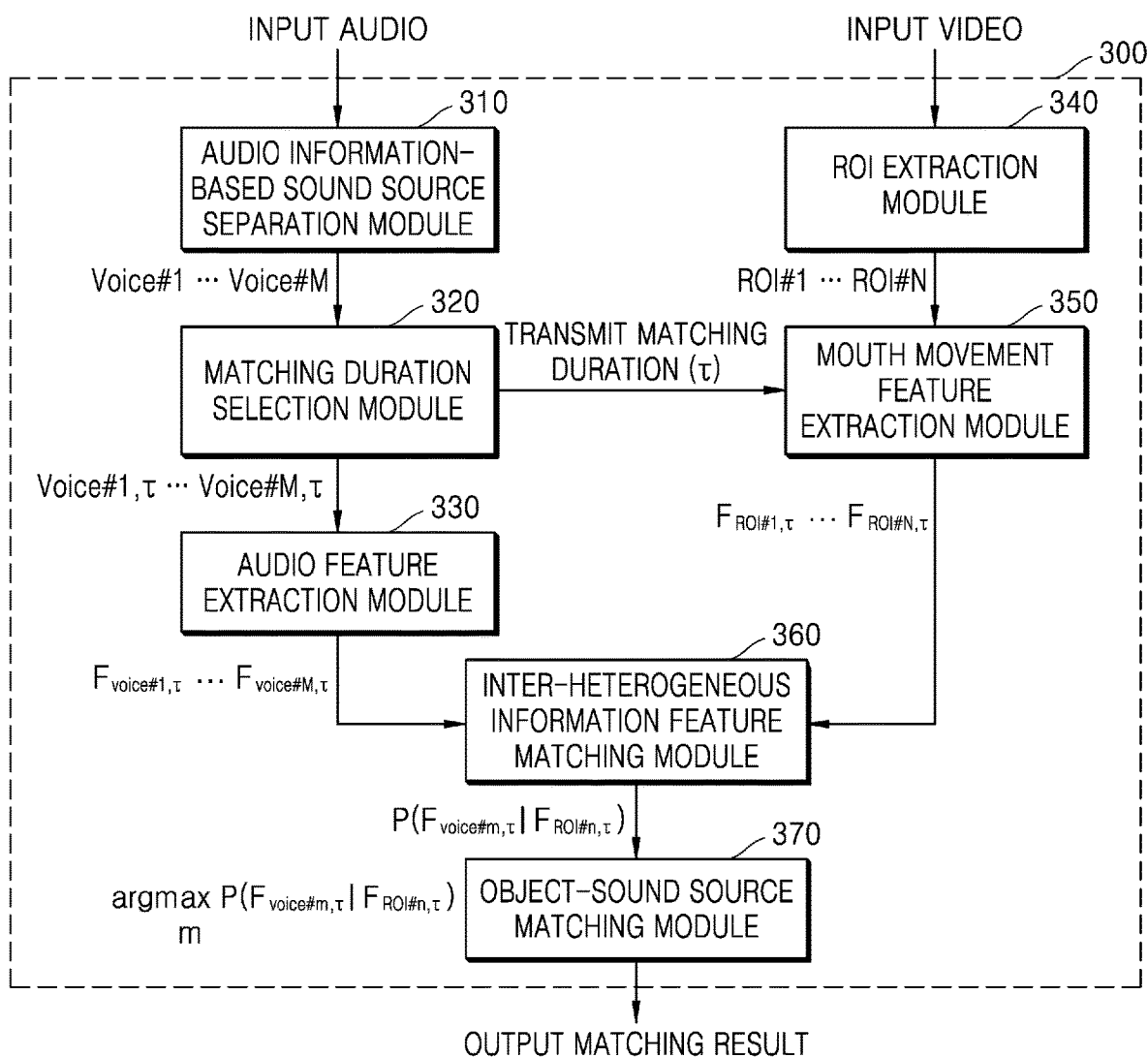
FIG. 3 is a diagram in which a program for performing a method of matching a sound source for each object included in a video is represented in a plurality of modules, according to an embodiment of the disclosure.

FIG. 3 is a diagram in which a program for performing a method of matching a sound source for each object included in a video is represented in a plurality of modules, according to an embodiment of the disclosure, and FIGS. 4 through 9 are diagrams of detailed configurations of the modules configuring the program of FIG. 3. Modules 310 through 370 of FIG. 3 may be obtained by classifying operations performed when the processor 230 executes a program 300 stored in the memory 240, according to functions. Thus, hereinafter, operations described to be performed by the modules 310 through 370 of FIG. 3 may be actually performed by the processor 230.

Referring to FIG. 3, the program 300 for matching a sound source for each of a plurality of objects included in a video, according to an embodiment of the disclosure, may include an audio information-based sound source separation module 310, a matching duration selection module 320, an audio feature extraction module 330, an ROI extraction module 340, a mouth movement feature extraction module 350, an inter-heterogeneous information feature matching module 360, and an object-sound source matching module 370.

Operations performed by the modules 310 through 370 shown in FIGS. 3 through 9 will be described with reference to flowcharts of FIGS. 10 through 14. In an embodiment of the disclosure described below, a video includes M sound sources (voices) and N objects.

FIGS. 10 through 14 are flowcharts of a method of matching a sound source for each object included in a video, and controlling reproduction of the video according to matching results, according to an embodiment of the disclosure.

Figure 10:
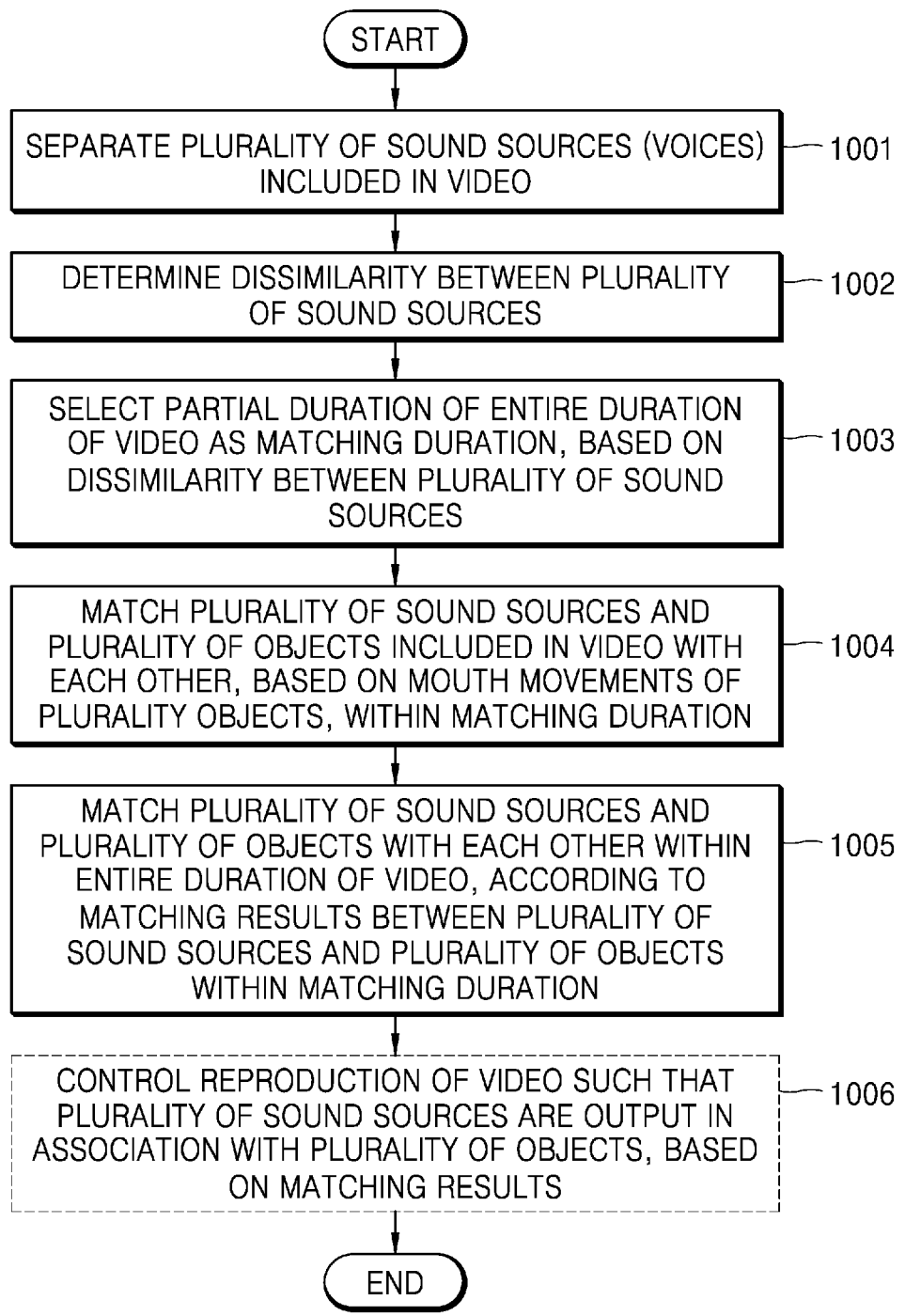
FIGS. 10, 11, 12, 13, and 14 are flowcharts of a method of matching a sound source for each object included in a video, and controlling reproduction of the video according to matching results, according to an embodiment of the disclosure.

Referring to FIG. 10, in operation 1001, the processor 230 of the computing device 200 may separate a plurality of sound sources included in a video. Operation 1001 may be performed by the audio information-based sound source separation module 310 of FIG. 3. The audio information-based sound source separation module 310 may separate the plurality of sound sources by only using audio information included in the video.

Figure 4:
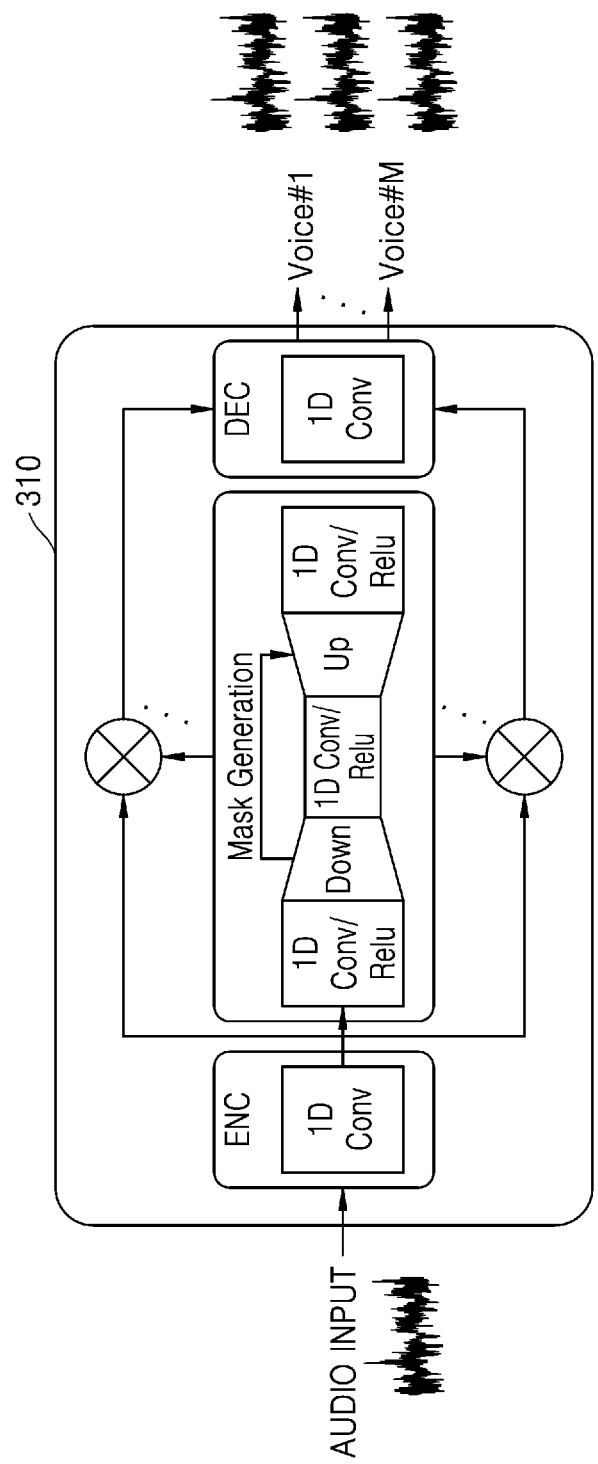
FIGS. 4, 5, 6, 7, 8, and 9 are diagrams of detailed configurations of the modules configuring the program of FIG. 3.

A detailed configuration of the audio information-based sound source separation module 310 is shown in FIG. 4. Referring to FIG. 4, the audio information-based sound source separation module 310 according to an embodiment of the disclosure may include an encoder ENC, a mask generation, and a decoder DEC. As shown in FIGS. 3 and 4, the audio information-based sound source separation module 310 may receive an audio input (the audio information included in the video) and separate the plurality of sound sources Voice #1, . . . , Voice #m, . . . , Voice #M therefrom.

1. Selection of Matching Duration

In operation 1002, the processor 230 may determine dissimilarity between the plurality of sound sources, and in operation 1003, the processor 230 may select a partial duration in an entire duration of the video as a matching duration, based on a result of determining the dissimilarity between the plurality of sound sources. Here, the "matching duration" denotes a duration where a process of matching an object with a sound source is performed, in particular, a duration where features (an image feature and an audio feature) extracted from the object and the sound source are compared to match the object with the sound source. In other words, according to an embodiment of the disclosure, the processor 230 performs an operation (feature comparison) for matching the object with the sound source only in the selected matching duration, instead of the entire duration of the video. By performing a matching operation only in the matching duration instead of the entire duration of the video, throughput may be effectively reduced, and by setting the matching duration as described below, high matching accuracy may be maintained.

Operations 1002 and 1003 may be performed by the matching duration selection module 320 of FIG. 3. To increase the matching accuracy while matching the objects included in the video with the sound sources, differences between the objects and the sound sources need to be high (e.g., when only one character speaks and the other one does not speak, or when speaking timings between characters are misaligned). Thus, according to an embodiment of the disclosure, to increase the matching accuracy between the object and the sound source, the matching duration selection module 320 may select a duration where the dissimilarity between the plurality of sound sources is the highest as the matching duration.

Figure 5:
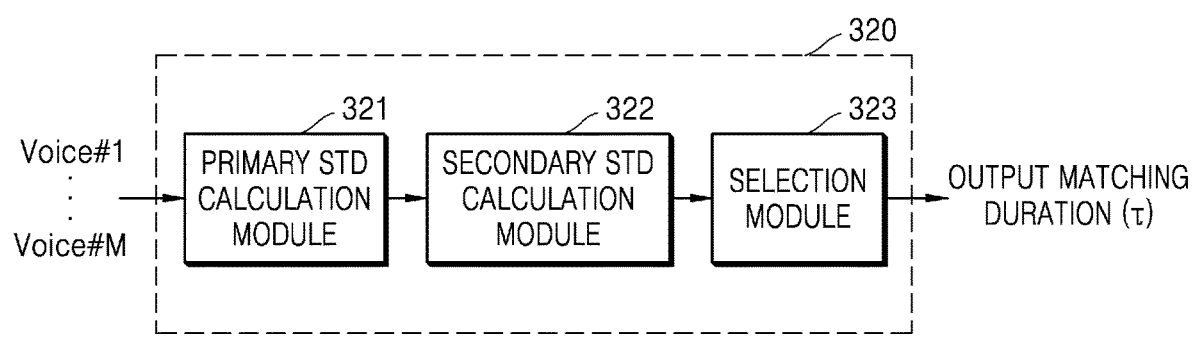

A detailed configuration of the matching duration selection module 320 is shown in FIG. 5. Referring to FIG. 5, the matching duration selection module 320 according to an embodiment of the disclosure may include a primary standard deviation (STD) calculation module 321, a secondary STD calculation module 322, and a selection module 323. The matching duration selection module 320 may receive the plurality of sound sources Voice #1, . . . , Voice #m, . . . , Voice #M separated by the audio information-based sound source separation module 310, select a matching duration τ therefrom, and output the same. A process by which the matching duration selection module 320 selects the matching duration will be described in detail with reference to FIGS. 11, 12, and 15.

Figure 11:
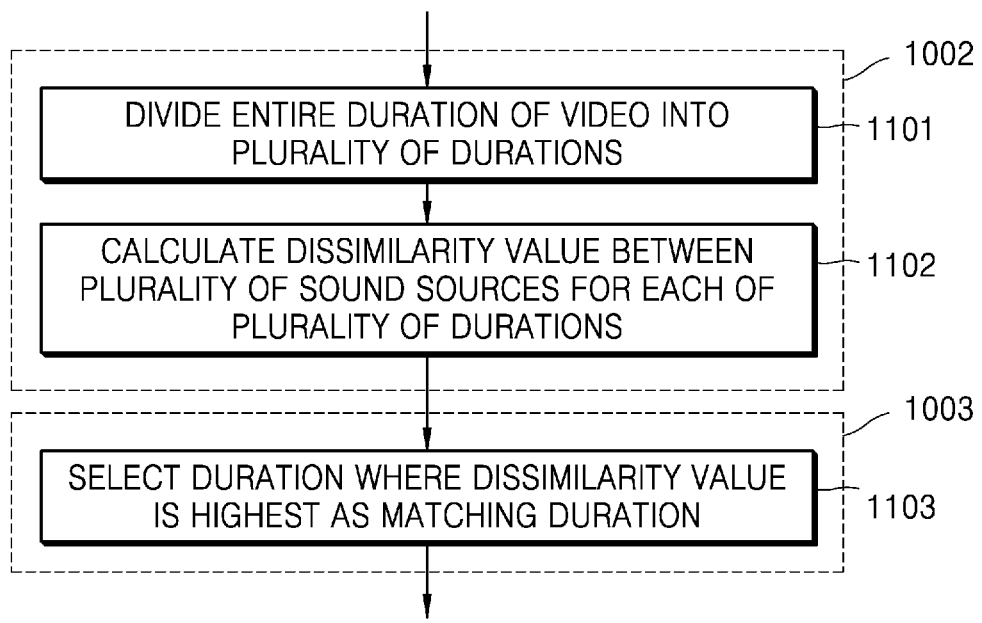

FIG. 11 is a flowchart of detailed operations included in operations 1002 and 1003 of FIG. 10. Referring to FIG. 11, in operation 1101, the matching duration selection module 320 divides the entire duration of the video into a plurality of durations. Here, lengths of durations may be variously set according to demands.

In operation 1102, the matching duration selection module 320 calculates a dissimilarity value between the plurality of sound sources for each of the plurality of durations. Here, the "dissimilarity value" is a numerical value indicating a degree of dissimilarity of sound sources, and denotes that the higher the dissimilarity value, the higher the degree of dissimilarity of the sound sources, i.e., there is a large difference between the sound sources. The dissimilarity value that is an index indicating the degree of dissimilarity may be calculated by using various methods, and according to an embodiment of the disclosure, the matching duration selection module 320 may calculate STDs of sound sources for each duration, calculate an STD of the STDs of the different sound sources, and use the STD as the dissimilarity value.

Figure 12:
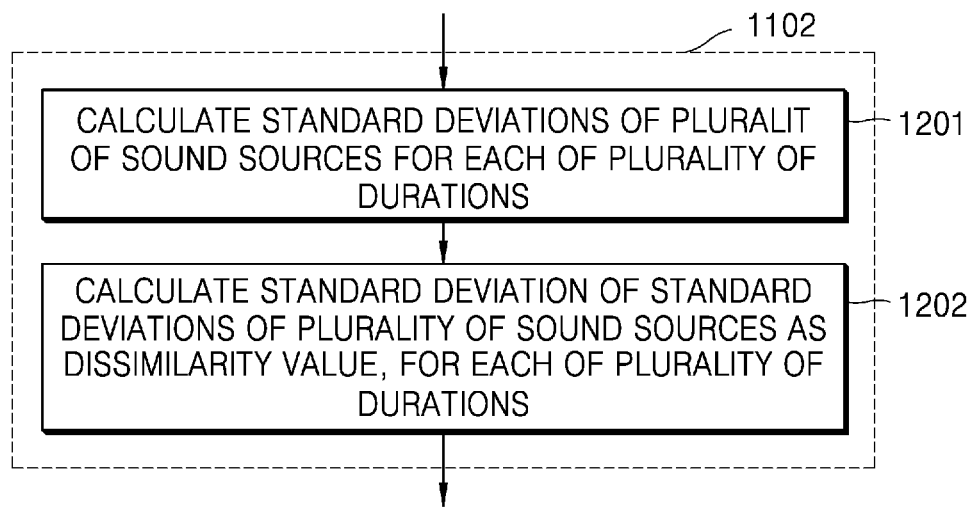

The primary STD calculation module 321 and the secondary STD calculation module 322 of the matching duration selection module 320 of FIG. 5 may calculate the dissimilarity value as described above. FIG. 12 illustrates detailed operations included in operation 1102 of FIG. 11. Referring to FIG. 12, in operation 1201, the primary STD calculation module 321 may calculate the STDs of the plurality of sound sources for each of the plurality of durations. In operation 1202, the secondary STD calculation module 322 may calculate, as the dissimilarity value, an STD of the STDs of the plurality of sound sources, for each of the plurality of durations. A method of calculating the STD of the STDs of the sound sources as the dissimilarity value will now be described with reference to a specific embodiment of the disclosure.

Figure 15:
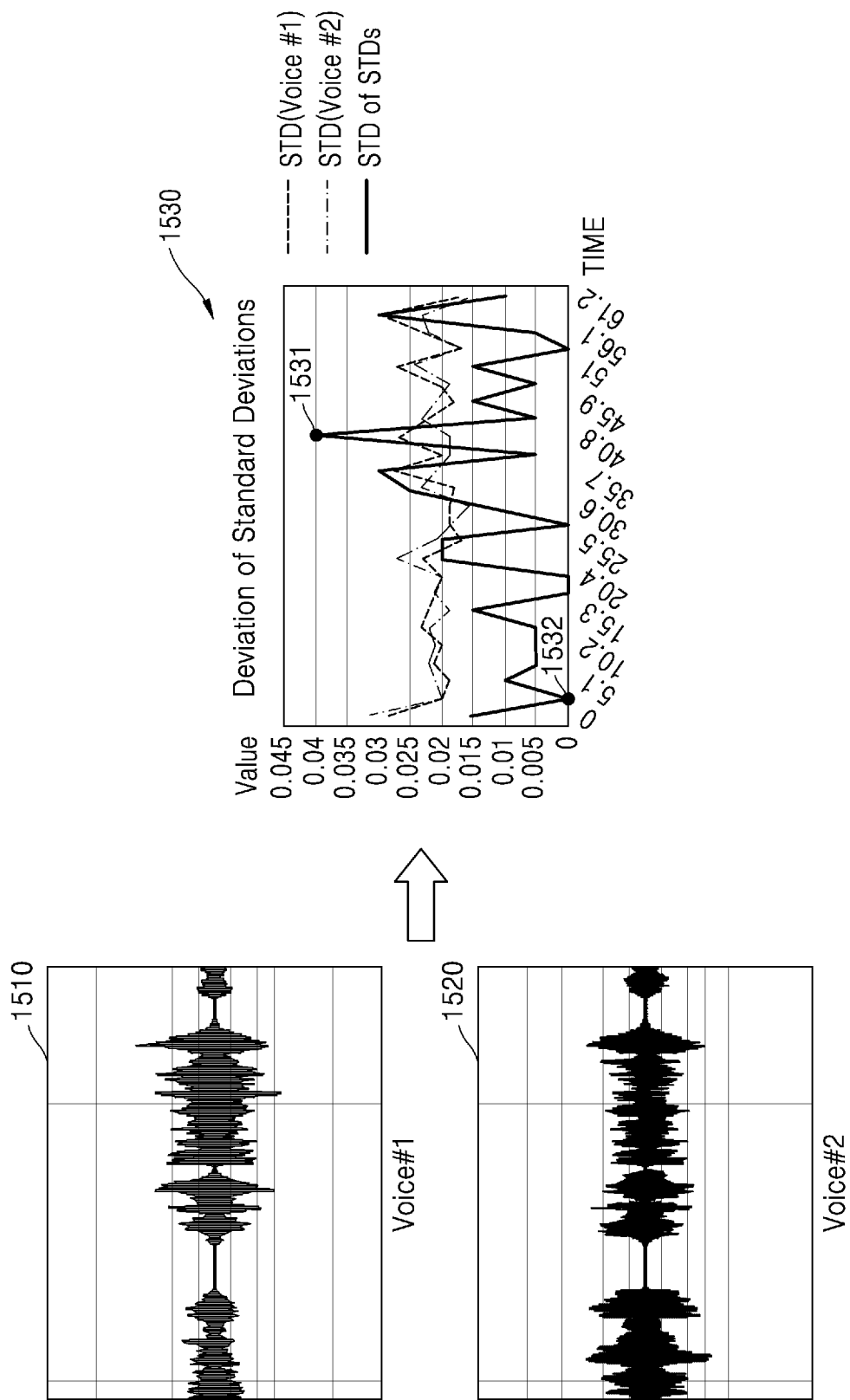
FIG. 15 is a diagram for describing, in detail, a method of selecting a portion in an entire duration of a video as a matching duration, according to an embodiment of the disclosure.

FIG. 15 is a diagram for describing, in detail, a method of selecting a portion of the entire duration of the video as the matching duration, according to an embodiment of the disclosure, and in detail, is a diagram showing an example of calculating the STD of the STDs of the sound sources as the dissimilarity value.

Referring to FIG. 15, a first graph 1510 is a graph showing an output of a first sound source Voice #1 and a second graph 1520 is a graph showing an output of a second sound source Voice #2. A process of calculating a dissimilarity value between the first sound source Voice #1 and the second sound source Voice #2 is as follows.

First, the matching duration selection module 320 calculates STDs of the first sound source Voice #1 and the second sound source Voice #2, for each duration. This corresponds to operation 1201 of FIG. 12 performed by the primary STD calculation module 321 of FIG. 5 described above. Results of calculating the STDs of the first sound source Voice #1 and the second sound source Voice #2 are shown as "STD (Voice #1)" and "STD(Voice #2)" in a third graph 1530.

Then, the matching duration selection module 320 calculates an STD of the STD of the first sound source Voice #1 and the STD of the second sound source Voice #2, for each duration. This corresponds to operation 1202 of FIG. 12 performed by the secondary STD calculation module 322 of FIG. 5 described above. A result of calculating the STD of the STD of the first sound source Voice #1 and the STD of the second sound source Voice #2 is shown as "STD of STDs" in the third graph 1530.

Referring back to FIG. 11, in operation 1103, the selection module 323 of the matching duration selection module 320 may select and output a duration where the dissimilarity value is the highest as the matching duration τ, by comparing the dissimilarity values calculated for each duration. In the third graph 1530 of FIG. 15, a duration where the dissimilarity value is the highest is indicated as a first point 1531, and a duration where the dissimilarity value is the lowest is indicated as a second point 1532. When the results of calculating the dissimilarity values are the same as the third graph 1530, the selection module 323 may select the first point 1531 as the matching duration τ.

Experiments have been performed to verify effects in which the matching accuracy is enhanced by selecting the duration where the dissimilarity value is the highest as the matching duration τ, and results thereof are shown in FIG. 17. In a table 1700 of FIG. 17, a "minimum error duration"

corresponds to the duration where the dissimilarity value is the lowest, i.e., the second point 1532 in the third graph 1530 of FIG. 15. Also, a "maximum error duration" in the table 1700 corresponds to the duration where the dissimilarity value is the highest, i.e., the first point 1531 in the third graph 1530 of FIG. 15.

In the table 1700 of FIG. 17, numerical values shown in the table 1700 correspond to probabilities that a first object Object #1 and a second object Object #2 are matched with the first sound source Voice #1 and the second sound source Voice #2, respectively, and a matching probability calculated through feature comparison in the minimum error duration and a matching probability calculated through feature comparison in the maximum error duration are all indicated.

Referring to the first object Object #1, as results of calculating the matching probability through the feature comparison in the minimum error duration, it is determined that a probability that the first sound source Voice #1 may correspond to the first object Object #1 is 0.6134 and a probability that the second sound source Voice #2 may correspond to the first object Object #1 is 0.3141. As results of calculating the matching probability through the feature comparison in the maximum error duration for the same first object Object #1, it is determined that a probability that the first sound source Voice #1 may correspond to the first object Object #1 is 0.9861 and a probability that the second sound source Voice #2 may correspond to the first object Object #1 is 0.0051.

Comparing results of the experiments in the two durations, it is determined that the matching probability calculated through the feature comparison in the maximum error duration further accurately indicate a matching sound source. The probability that the first sound source Voice #1 may be matched with the first object Object #1 is also higher in the minimum error duration, but a difference between the probabilities is greater in the maximum error duration. In the results of experiments regarding the second object Object #2, it is also determined that the matching probability calculated through the feature comparison in the maximum error duration is further clearly distinguished.

The matching duration selection module 320 may output the selected matching duration τ to the mouth movement feature extraction module 350, and may receive the plurality of sound sources Voice #1, . . . , Voice #m, . . . , Voice #M and output a plurality of sound sources Voice #1, τ, . . . , Voice #m, τ, . . . , Voice #M, τ regarding the matching duration τ.

2. Sound Source Matching Based on Mouth Movements of Objects within Matching Duration Referring back to FIG. 10, in operation 1004, the processor 230 may match the plurality of sound sources and the plurality of objects included in the video with each other, based on mouth movements of the plurality of objects, within the matching duration. Here, the "mouth movement" is a concept wider than a shape or movement of lips of a speaker, and includes not only changes in a lip shape of an object (speaker), but also changes in a face shape of a periphery of mouth of the object. The matching is performed based on the mouth movements of the wide concept defined as such, so as to prevent an issue where matching accuracy is decreased when occlusion, in which a part of the mouth of the object is covered (e.g., when the speaker speaks close to a microphone), occurs. A specific method of performing matching, based on the mouth movements, will be described in detail below.

Operation 1004 may be performed by the audio feature extraction module 330, the ROI extraction module 340, the mouth movement feature extraction module 350, the inter-heterogeneous information feature matching module 360, and the object-sound source matching module 370 of FIG. 3. Operation 1004 will be described in detail below with reference to FIGS. 13, 14, and 16.

Figure 13:
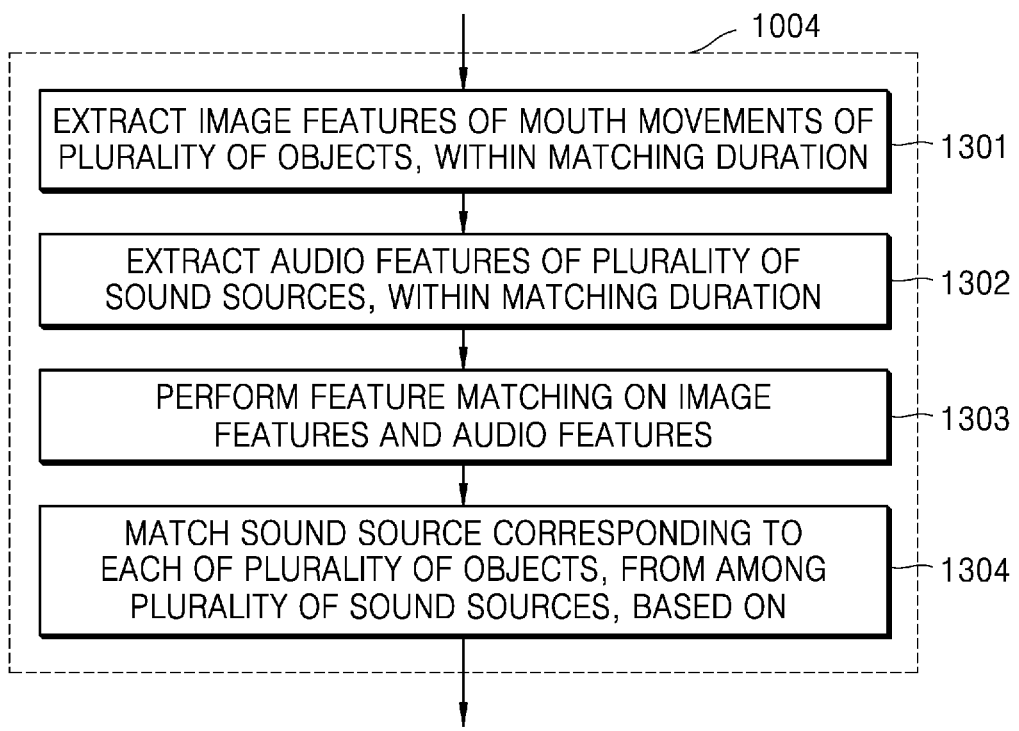

FIG. 13 is a flowchart of detailed operations included in operation 1004 of FIG. 10. Referring to FIG. 13, in operation 1301, the processor 230 may extract image features of the mouth movements of the plurality of objects, within the matching duration. Operation 1301 may be performed by the ROI extraction module 340 and the mouth movement feature extraction module 350 of FIG. 3.

Figure 14:
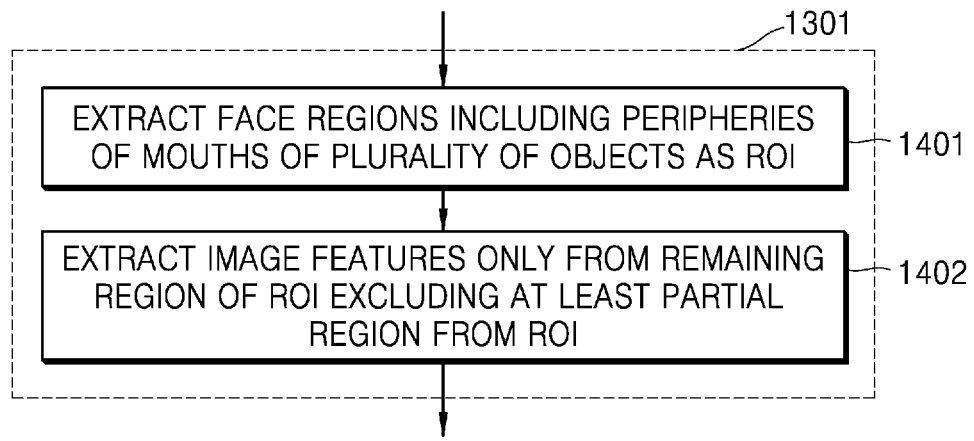

FIG. 14 is a flowchart of detailed operations included in operation 1301 of FIG. 13. Operation 1401 may be performed by the ROI extraction module 340 and operation1 402 may be performed by the mouth movement feature extraction module 350.

Figure 7:
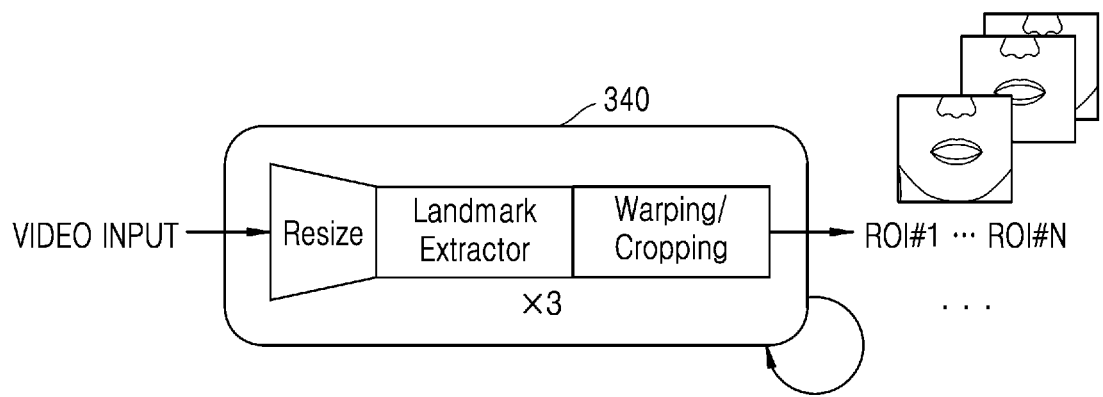

In operation 1401, the ROI extraction module 340 may extract face regions including peripheries of mouths of the plurality of objects as an ROI image. A detailed configuration of the ROI extraction module 340 is shown in FIG. 7. The ROI extraction module 340 may receive a video input (video information included in the video), and extract a plurality of ROI images ROI #1, . . . , ROI #n, . . . , ROI #N therefrom. As described above, in the present embodiment of the disclosure, the mouth movement feature extraction module 350 described below extracts even features of the changes in the face shape of the periphery of mouth of the object, so as to prevent the issue in which the matching accuracy decreases when the occlusion occurs, and thus the ROI extraction module 340 may extract the ROI to include the entire mouth of the object and also include a mouth peripheral region within a certain distance from the mouth.

Figure 8:
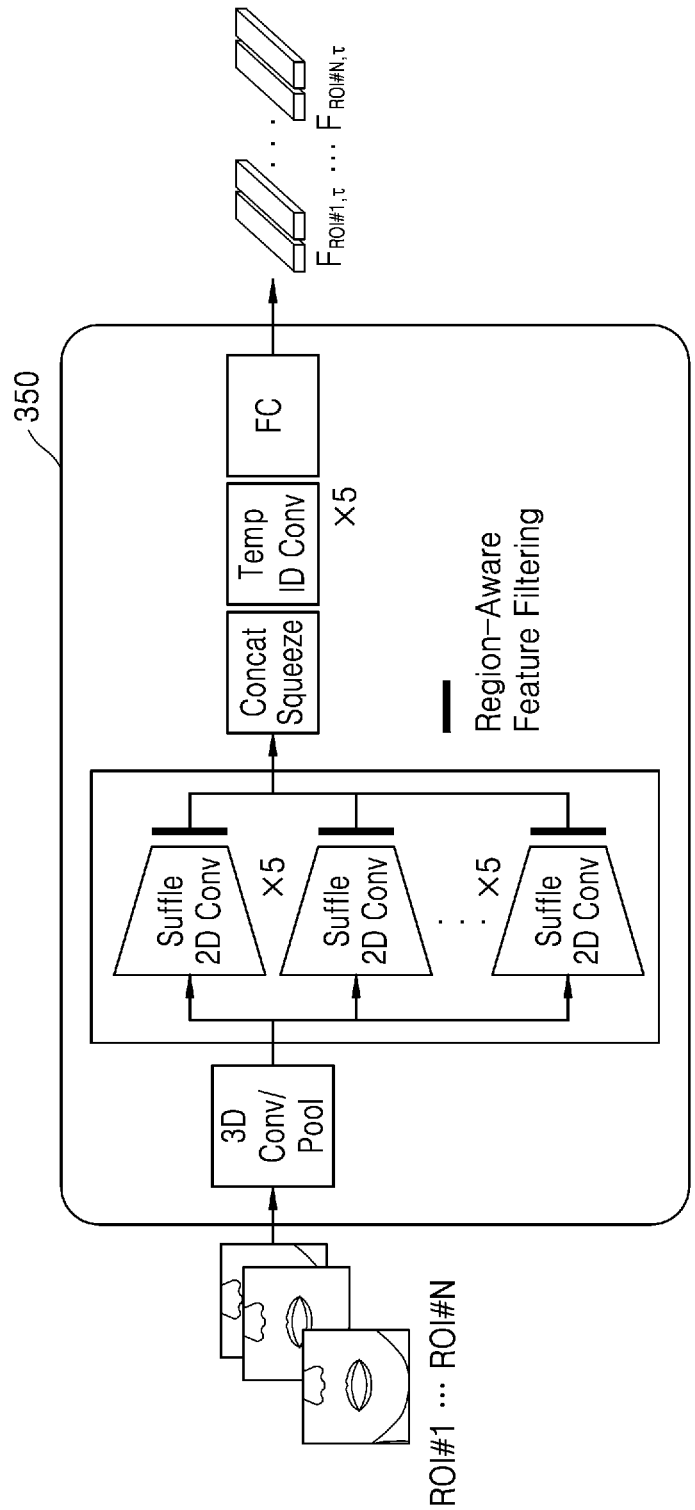

In operation 1402, the mouth movement feature extraction module 350 may extract the image features only from a remaining region of the ROI image excluding at least a partial region of the ROI image, and may repeatedly extract the image features while differently setting the at least the partial region excluded from the ROI image. A detailed configuration of the mouth movement feature extraction module 350 is shown in FIG. 8. The mouth movement feature extraction module 350 may extract image features $F_{ROI\ \#1,\ \tau}, \ldots, F_{ROI\ \#n,\ \tau}, \ldots, F_{ROI\ \#N,\ \tau}$ from the plurality of ROI images ROI #1, . . . , ROI #n, . . . , ROI #N in the matching duration τ. In detail, the mouth movement feature extraction module 350 receives, from the ROI extraction module 340, the plurality of ROI images ROI #1, . . . , ROI #n, . . . , ROI #N extracted from the entire duration of the video, but may receive information about the matching duration τ from the matching duration selection module 320 and extract the image features only for ROI images located within the matching duration τ.

The mouth movement feature extraction module 350 may extract features not only from entire regions of the plurality of ROI images ROI #1, . . . , ROI #n, . . . , ROI #N, but also from the remaining regions excluding partial regions. The flowchart of FIG. 14 includes only operation 1402, in which the image features are extracted only from the remaining region of the ROI excluding the at least the partial region of the ROI (without an operation of extracting image features from the entire region of the ROI), but the extracting, by the mouth movement feature extraction module 350, of the image features from the entire region of the ROI is not excluded but may be selectively included.

The mouth movement feature extraction module 350 may extract the image features after performing region-ware feature filtering on the provided ROI image, and may repeatedly extract the image features from a same ROI image while variously changing a region for the region-ware feature filtering. A method of extracting mouth movement features from the ROI images ROI #1, . . . , ROI #n, . . . , ROI #N will be described in detail with reference to FIG. 16.

Figure 16:
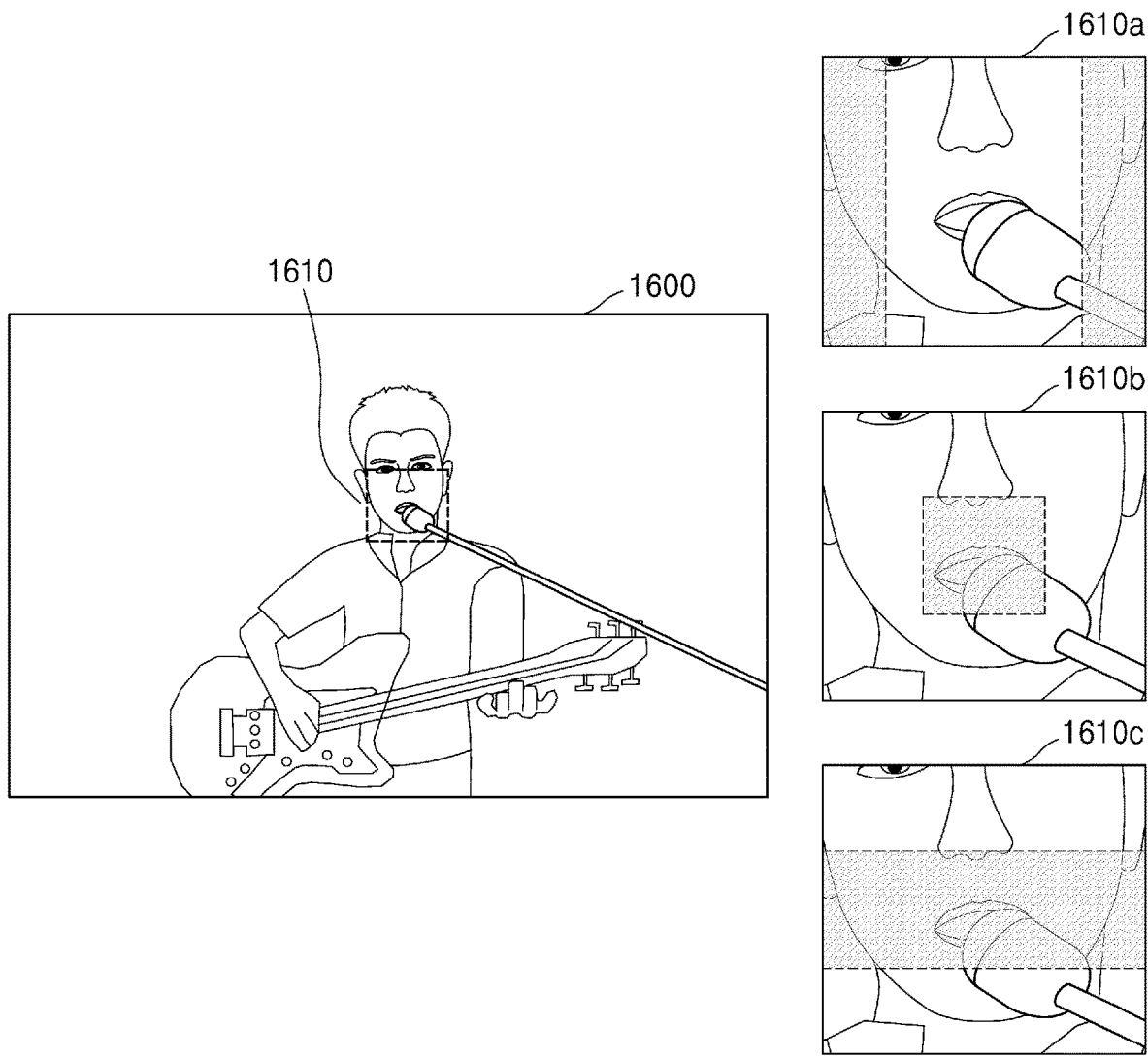
FIG. 16 is a diagram for describing a method of extracting an image feature for mouth movements of an object, according to an embodiment of the disclosure.

FIG. 16 is a diagram for describing, in detail, a method of extracting an image feature for mouth movements of an object, according to an embodiment of the disclosure. Referring to FIG. 16, the ROI extraction module 340 may extract, from an entire image 1600, a region including an entire mouth of an object and including a mouth peripheral region within a certain distance from the mouth as an ROI image 1610.

ROI images 1610a, 1610b, and 1610c, in which regions to be filtered are changed slightly, are illustrated at the right of FIG. 16. Gray regions in the ROI images 1610a, 1610b, and 1610c indicate regions excluded during image feature extraction (hereinafter, referred to as filtering regions). The filtering regions shown in FIG. 16 are only examples, and the filtering regions may be set in various manners. The mouth movement feature extraction module 350 may extract image features from the entire ROI image 1610, but may also extract image features from the ROI images 1610a, 1610b, and 1610c, in which partial regions are filtered, and combine the extracted image features to output image features $F_{ROI\ \#1,\ \tau}$, . . . , $F_{ROI\ \#n,\ \tau}$, . . . , $F_{ROI\ \#N,\ \tau}$.

As such, the mouth movement feature extraction module 350 may extract the image features while slightly varying target regions in the ROI image 1610, and combine the results, thereby extracting the image features $F_{ROI\ \#1,\ \tau}$, . . . , $F_{ROI\ \#m,\ \tau}$, . . . , $F_{ROI\ \#N,\tau}$ reflecting not only the changes in the lip shapes of the object, but also the changes in the face shapes in the periphery of mouth. Accordingly, the high matching accuracy may be maintained even when the occlusion occurs as a part of the mouth of the object is covered by another object.

Figure 6:
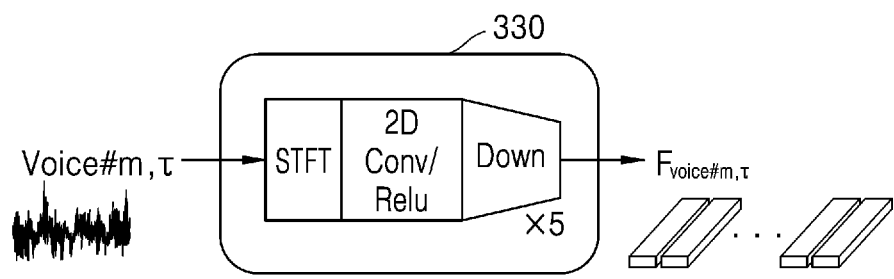

Referring back to FIG. 13, in operation 1302, the processor 230 may extract audio features from the plurality of sound sources, within the matching duration. Operation 1302 may be performed by the audio feature extraction module 330, and a detailed configuration of the audio feature extraction module 330 is shown in FIG. 6. The audio feature extraction module 330 may extract audio features $F_{Voice\ \#1,\tau}$, . . . , $F_{Voice\ \#m,\tau}$, . . . , $F_{Voice\ \#M,\tau}$ from the plurality of sound sources Voice #1,τ, . . . , Voice #m,τ, . . . , Voice #M,τ of the matching duration τ.

In operation 1303, the processor 230 may perform feature matching on the image features $F_{ROI\ \#1,\tau}$, . . . , $F_{ROI\ \#m,\tau}$, . . . , $F_{ROI\ \#N,\tau}$ and the audio features $F_{Voice\ \#1,\tau}$, . . . , $F_{Voice\ \#m,\tau}$, . . . , $F_{Voice\ \#M,\tau}$, which are extracted in previous operations. Operation 1303 may be performed by the inter-heterogeneous information feature matching module 360, and a detailed configuration of the inter-heterogeneous information feature matching module 360 is shown in FIG. 9.

Figure 9:
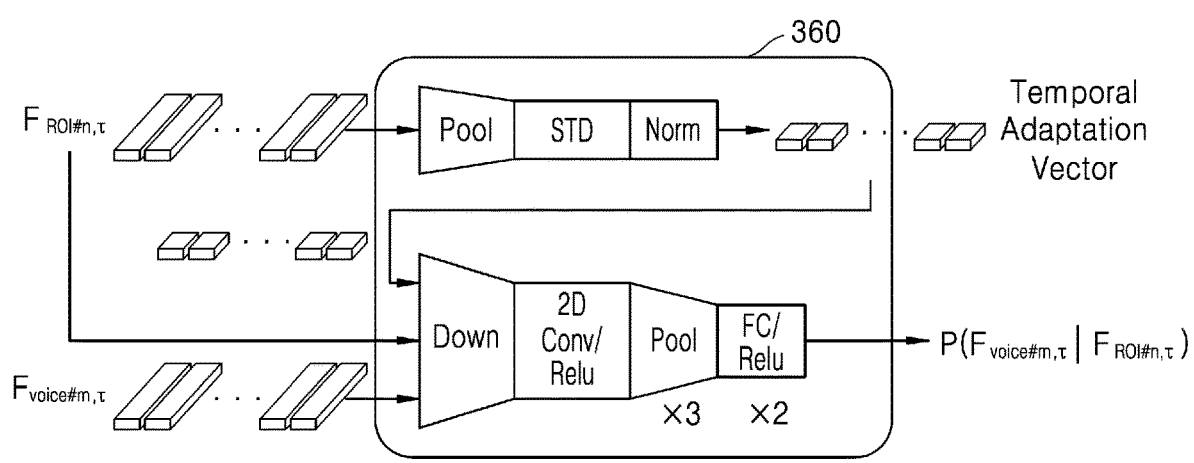

Referring to FIG. 9, the inter-heterogeneous information feature matching module 360 may output a probability $P(F_{Voice\ \#m,\tau}|F_{ROI\ \#n,\tau})$ that a corresponding object and a corresponding sound source may correspond to each other, by performing the feature matching on the image feature $F_{ROI\ \#n,\tau}$ extracted from an ROI image of one object and the audio feature $F_{Voice\ \#m,\tau}$ extracted from one sound source.

When matching is performed on different types of information (an image feature and an audio feature), matching accuracy may decrease due to a feature difference between the information, and the inter-heterogeneous information feature matching module 360 may use a temporal adaptation vector to prevent the decrease in the matching accuracy. Functions and technical meaning of the temporal adaptation vector will now be described in detail.

Video and audio generally greatly differ in resolutions on a time axis. For example, general video resolution is 30 fps, whereas general audio resolution is 48 kHz, which is noticeably higher than the video resolution. Due to such a large resolution difference, the audio changes often while the video barely changes (e.g., another voice is continuously output while there is barely a change in lip shapes). Accordingly, the matching accuracy is increased when a video feature (the image feature) and the audio feature are matched in a duration where the video rapidly changes.

Accordingly, the inter-heterogeneous information feature matching module 360 according to an embodiment of the disclosure may generate, based on the video feature (image feature), a vector (the temporal adaptation vector) for providing a greater weight to the duration where the video rapidly changes, and increase the matching accuracy by assigning a weight to features (the video features and the audio features) of a specific duration by using the generated vector.

The inter-heterogeneous information feature matching module 360 may perform the feature matching on the image feature $F_{ROI\ \#n,\tau}$ and the audio feature $F_{Voice\ \#m,\tau}$ by measuring similarity between the two features. For example, the inter-heterogeneous information feature matching module 360 may calculate a distance (e.g., a Euclidean distance, a Manhattan distance, or a Minkowski distance) between the two features through any one of various methods, and determine that the similarity is high when the distance is short. The matching probability between the two features may be calculated to be high when the similarity between the image feature $F_{ROI\ \#n,\tau}$ and the audio feature $F_{Voice\ \#m,\tau}$ is high.

In summary, the inter-heterogeneous information feature matching module 360 may measure the similarity between the image feature $F_{ROI\ \#n,\tau}$ and the audio feature $F_{Voice\ \#m,\tau}$, while assigning a greater weight to the similarity in a duration where a change in the image feature $F_{ROI\ \#n,\tau}$ over time is greater, and calculate probabilities that each of the plurality of sound sources may correspond to each of the plurality of objects, based on the measured similarity.

In other words, the inter-heterogeneous information feature matching module 360 may perform matching by assigning a greater weight to the image feature $F_{ROI\ \#n,\tau}$ and the audio feature $F_{Voice\ \#m,\tau}$ in the duration where the change in the image feature $F_{ROI\ \#n,\tau}$ is greater, and calculate the probabilities that each of the plurality of sound sources may correspond to each of the plurality of objects, based on a result of performing the matching.

Referring back to FIG. 13, in operation 1304, the processor 230 may match a sound source corresponding to each of the plurality of objects, from among the plurality of sound sources, based on results of the feature matching. Operation 1304 may be performed by the object-sound source matching module 370, and the object-sound source matching module 370 may select an object-sound source pair in which a matching probability is highest, according to Equation 1 below.

$$\arg\max_{m} P(F_{voice\#m,\tau}|F_{ROI\#n,\tau}) \qquad \text{[Equation 1]}$$

The computing device 200 may match a corresponding sound source for each object included in the video by performing the above-described processes.

Referring back to FIG. 10, in operation 1005, the processor 230 may match the plurality of objects with the plurality of sound sources in the entire duration of the video, based on results of matching between the plurality of sound sources and the plurality of objects in the matching duration. In other words, the processor 230 performs the matching through comparison between the image feature and the audio feature only in the matching duration that is the partial duration of the entire duration of the video, and extends and applies the result of the matching to the entire duration, and thus matching between a sound source and an object is possible with a relatively low throughput.

3. Control of Video Reproduction According to Matching Results

In operation 1006, the processor 230 may control reproduction of the video such that the plurality of sound sources are output in association with the plurality of objects, based on the matching results. Operation 1006 of FIG. 10 is indicated in broken lines to indicate that operation 1006 is optional.

Figure 18:
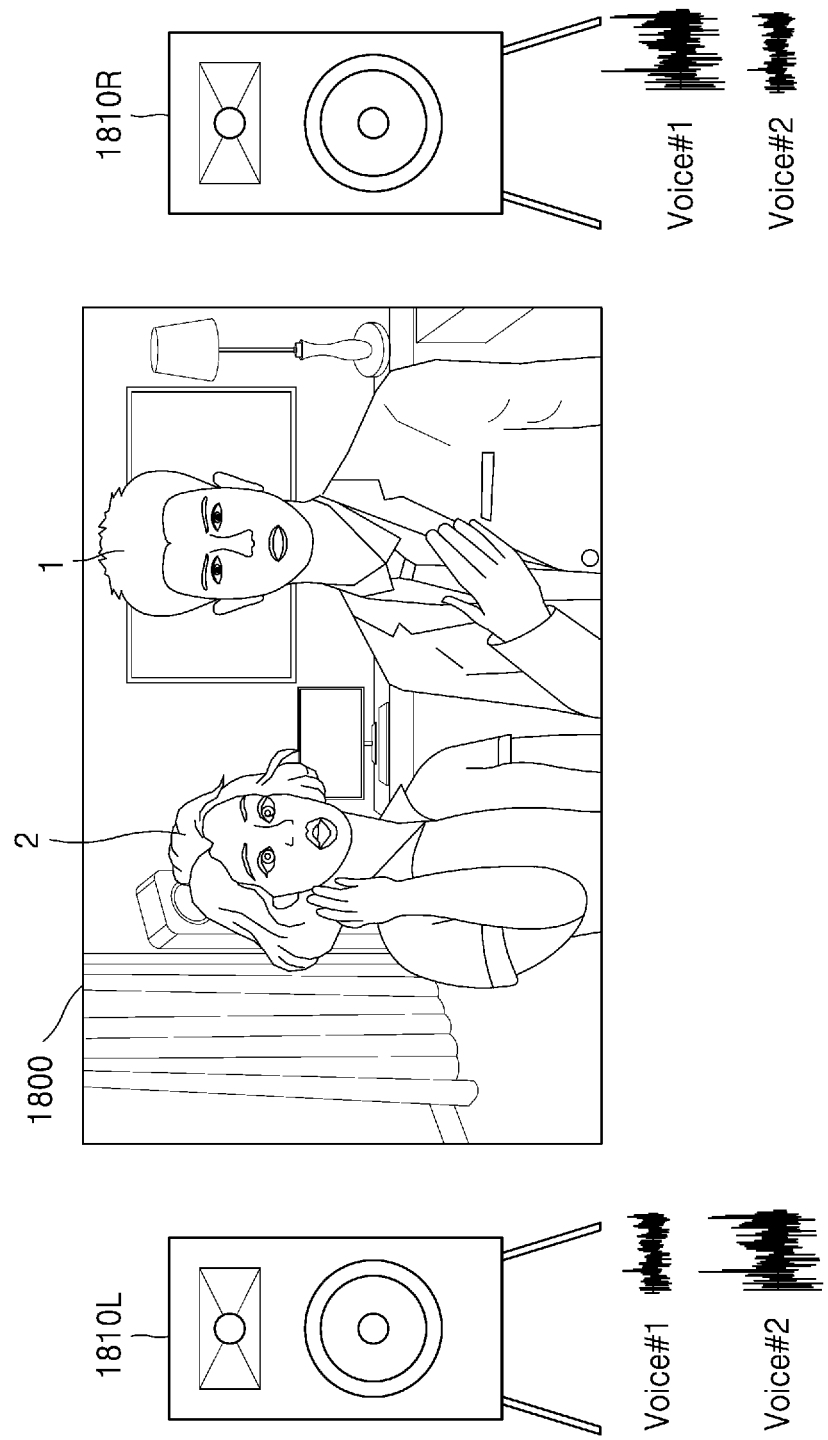
FIGS. 18, 19, and 20 are diagrams for describing an embodiment of the disclosure for controlling reproduction of a video, based on results of matching a sound source for each object included in a video, according to an embodiment of the disclosure.
Figure 19:
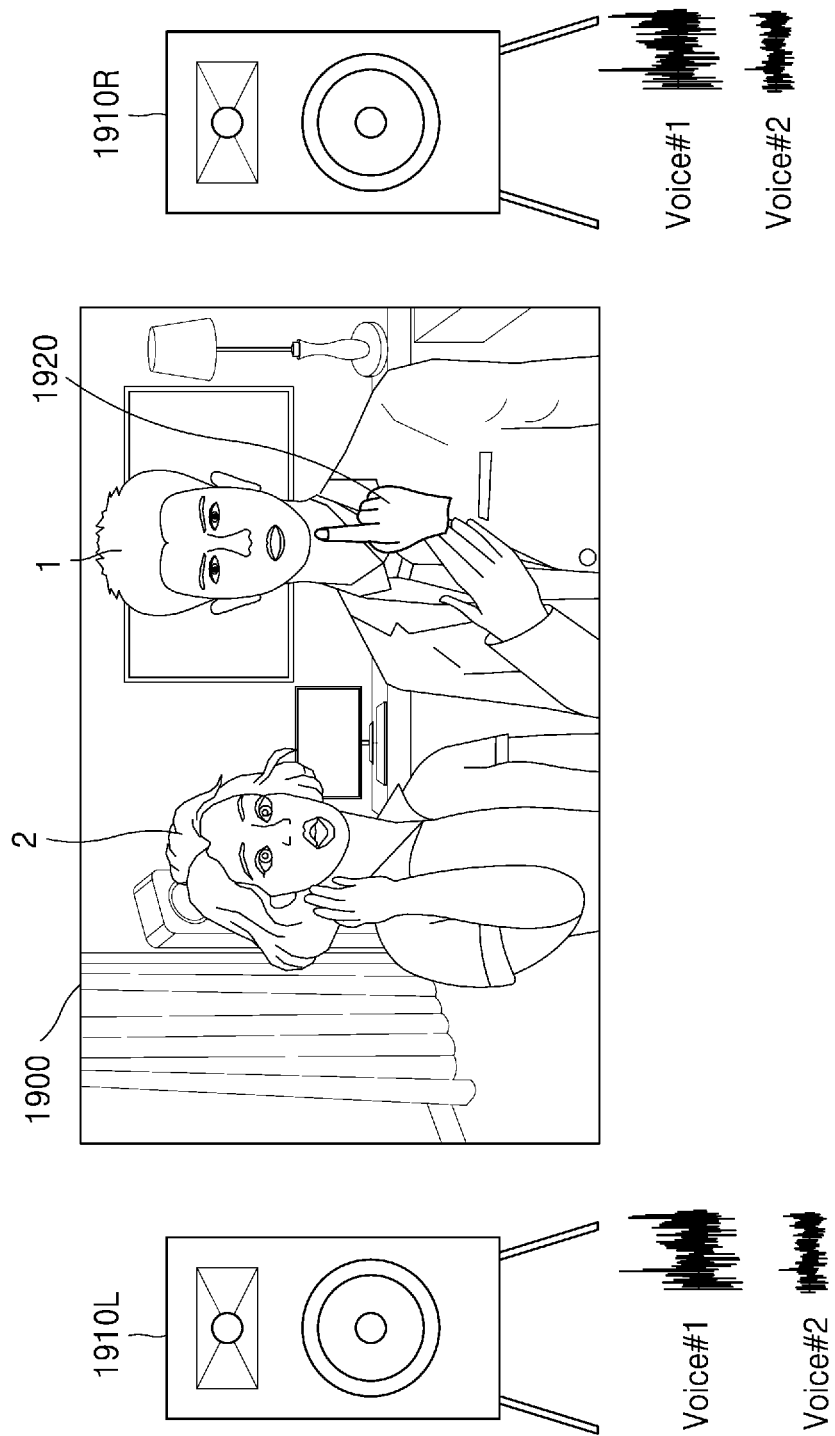
Figure 20:
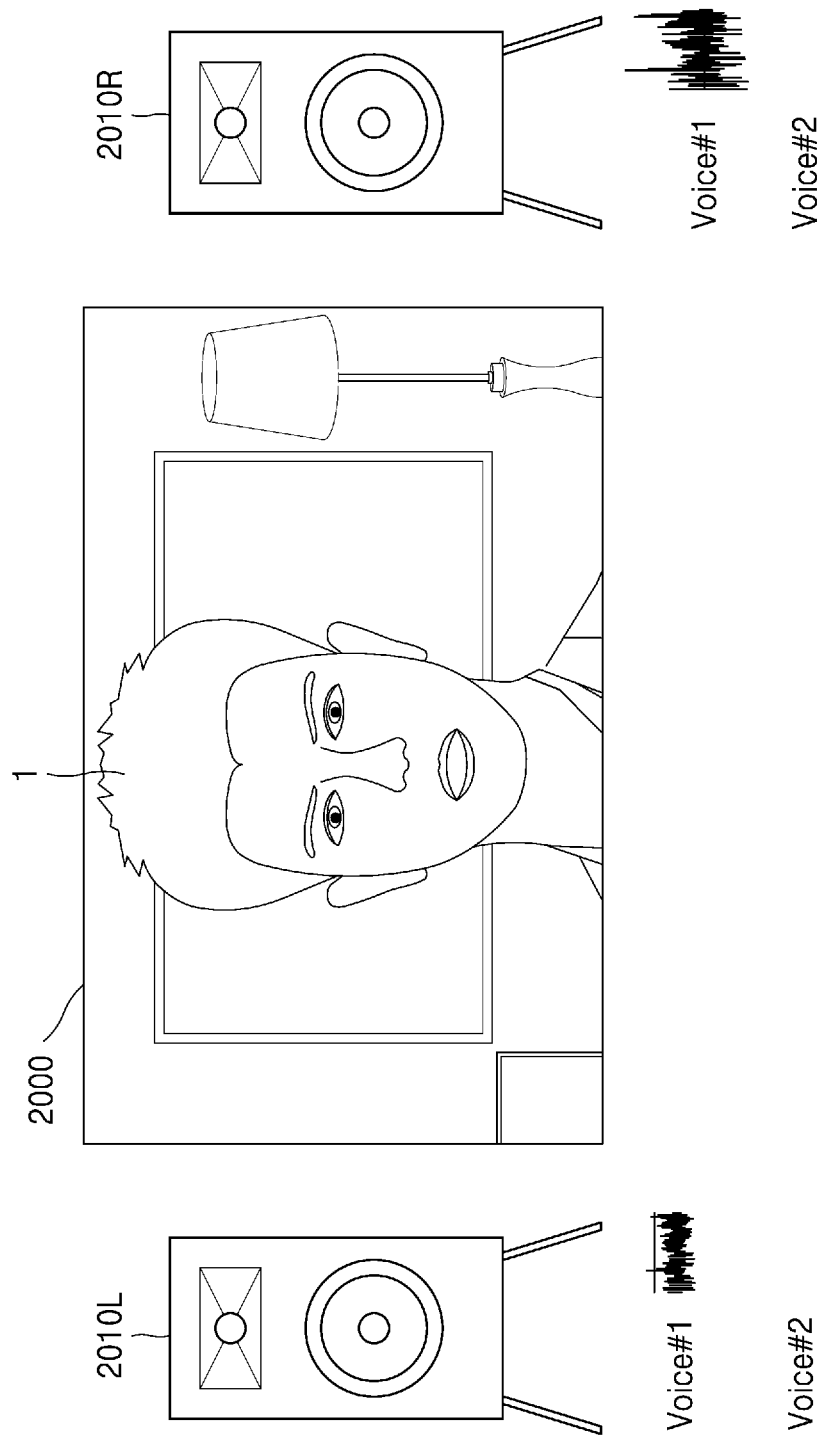

FIGS. 18 through 20 are diagrams for describing an embodiment of the disclosure for controlling reproduction of a video, based on results of matching a sound source for each object included in a video.

According to an embodiment of the disclosure, the computing device 200 may control sound sources matched to a plurality of objects to be allocated to a plurality of speakers, based on locations of the plurality of objects in a video, as shown in FIG. 18.

Referring to FIG. 18, first and second objects 1 and 2 included in a reproduction screen 1800 are respectively outputting voices, and a first voice Voice #1 corresponds to the first object 1 and a second voice Voice #2 corresponds to the second object 2.

The computing device 200 may perform operations 1001 through 1003 of FIG. 10 to output results of matching the first voice Voice #1 with the first object 1 and matching the second voice Voice #2 with the second object 2.

In the reproduction screen 1800, the first object 1 is located at the right and the second object 2 is located at the left, and thus the computing device 200 may amplify and output the second voice Voice #2 through a left speaker 1810L and amplify and output the first voice Voice #1 through a right speaker 1810R. Accordingly, a viewer may be able to feel realism or a stereoscopic effect of sound better through an output of voice according to location of an object.

According to an embodiment of the disclosure, upon receiving an input of selecting one of a plurality of objects while reproducing a video, the computing device 200 may control an output of a sound source corresponding to the selected object from among a plurality of sound sources to be emphasized, as shown in FIG. 19.

Referring to FIG. 19, the first and second objects 1 and 2 included in a reproduction screen 1900 are respectively outputting voices, and the first voice Voice #1 corresponds to the first object 1 and the second voice Voice #2 corresponds to the second object 2.

The computing device 200 may perform operations 1001 through 1004 of FIG. 10 to output results of matching the first voice Voice #1 with the first object 1 and matching the second voice Voice #2 with the second object 2.

When a viewer selects the first object 1 through a selection unit 1920, such as a finger or a mouse cursor, the computing device 200 may control the first voice Voice #1 matched with the first object 1 to be emphasized and output. Accordingly, the first voice Voice #1 is amplified and output from both a left speaker 1910L and a right speaker 1910R.

In FIG. 19, the first voice Voice #1 and the second voice Voice #2 are both output from the left and right speakers 1910L and 1910R, while only the first voice Voice #1 is amplified and output, but on the other hand, the computing device 200 may control only the first voice Voice #1 to be output, excluding the second voice Voice #2, when the first object 1 is selected.

According to an embodiment of the disclosure, upon receiving an input of zooming-in a region where one of a plurality of objects is displayed while reproducing a video, the computing device 200 may control an output of a sound source corresponding to the object included in the zoomed-in region, from among a plurality of sound sources, to be emphasized, as shown in FIG. 20.

A reproduction screen 2000 of FIG. 20 is a screen obtained by enlarging a region of the reproduction screen 1900 of FIG. 19, which includes the first object 1. It is assumed that the first and second objects 1 and 2 included in an entire screen before the enlargement are respectively outputting voices, and the first voice Voice #1 corresponds to the first object 1 and the second voice Voice #2 corresponds to the second object 2.

The computing device 200 may perform operations 1001 through 1003 of FIG. 10 to output results of matching the first voice Voice #1 with the first object 1 and matching the second voice Voice #2 with the second object 2.

When the reproduction screen 2000 is displayed as a viewer enlarges the region including the first object 1 through a touch input or the like, the computing device 200 may control the first voice Voice #1 matched with the first object 1 to be emphasized and output. Accordingly, only the first voice Voice #1 is output from both a left speaker 2010L and a right speaker 2010R.

In FIG. 20, only the first voice Voice #1 is output from the left and right speakers 2010L and 2010R, excluding the second voice Voice #2, but on the other hand, the computing device 200 may output both the first voice Voice #1 and the second voice Voice #2 from the left and right speakers 2010L and 2010R, while amplifying only the first voice Voice #1.

A method of matching a voice for each object included in a video, according to an embodiment of the disclosure, includes determining dissimilarity between a plurality of voices, selecting a partial duration in an entire duration of the video as a matching duration, based on the dissimilarity between the plurality of voices, matching the plurality of voices with a plurality of objects included in the video respectively, based on mouth movements of the plurality of objects, within the matching duration, and matching the plurality of voices with the plurality of objects respectively in the entire duration of the video, based on results of the matching between the plurality of voices and the plurality of objects within the matching duration.

According to an embodiment of the disclosure, the mouth movements may include changes in lip shapes of the plurality of objects or changes in face shapes of peripheries of mouths of the plurality of objects.

According to an embodiment of the disclosure, the selecting of the partial duration of the entire duration of the video as the matching duration may include dividing the entire duration of the video into a plurality of durations, calculating a dissimilarity value between the plurality of voices for each of the plurality of durations, and selecting a duration with a highest calculated dissimilarity value as the matching duration.

According to an embodiment of the disclosure, the calculating of the dissimilarity value may include calculating standard deviations of the plurality of voices for each of the plurality of durations, and calculating a standard deviation of the standard deviations of the plurality of voices as the dissimilarity value, for each of the plurality of durations.

According to an embodiment of the disclosure, the matching of the plurality of voices with a plurality of objects included in the video respectively within the matching duration may include extracting, from the matching duration, image features of the mouth movements of the plurality of objects, extracting, from the matching duration, audio features of the plurality of voices, performing feature matching on the image features and the audio features, and matching voices respectively corresponding to the plurality objects from among the plurality of voices, based on a result of the feature matching.

According to an embodiment of the disclosure, the performing of the feature matching includes measuring similarity between the image features and the audio features, wherein a greater weight is assigned to the similarity in a duration where changes in the image features over time are greater, and calculating a probability that the plurality of voices correspond to the plurality of objects respectively, based on the measured similarity.

According to an embodiment of the disclosure, the performing of the feature matching includes measuring at least a first similarity and a second similarity between the image features and the audio features, wherein a first weight is assigned to the first similarity and a second weight is assigned to the second similarity, wherein first changes of the image features over a first duration for the first similarity are greater than second changes of the image features over a second duration for the second similarity, the first weight is greater than the second weight, and determining a probability that the plurality of voices correspond to the plurality of objects respectively, based on the measured similarity.

According to an embodiment of the disclosure, the performing of the feature matching may include performing matching by assigning a greater weight to the image features and the audio features in a section where changes in the image features are greater, and calculating a probability that the plurality of voices correspond to the plurality objects respectively, based on a result of performing the matching.

According to an embodiment of the disclosure, the performing of the feature matching may include perform matching by assigning a first weight to first image features and first audio features, assigning a second weight to second image features and second audio features, wherein first changes of the first image features in a first section are greater than second changes of the second image features, the first weight is greater than the second weight, and determining a probability that the plurality of voices correspond to the plurality objects respectively, based on a result of performing the matching.

According to an embodiment of the disclosure, the extracting of the image features of the mouth movements may include extracting, as a region of interest (ROI), face regions including the peripheries of mounts of the plurality of object, and extracting the image features only from a remaining region of the ROI excluding at least a partial region of the ROI.

According to an embodiment of the disclosure, the extracting of the image features only from the remaining region may include extracting the image features repeatedly while differently setting the at least the partial region excluded from the ROI.

According to an embodiment of the disclosure, the method may further include controlling reproduction of the video such that the plurality of voices are output in association with the plurality of objects, based on a result of the matching in the entire duration.

According to an embodiment of the disclosure, the controlling of the reproduction of the video may include, when an input of selecting a first object from among the plurality of objects is received during the reproduction of the video, emphasizing an output of a first voice corresponding to the first object, from among the plurality of voices.

According to an embodiment of the disclosure, the input of selecting the first object from among the plurality of objects may be in a form of zooming in or touching a region where the first object is displayed on a screen where the video is being reproduced.

According to an embodiment of the disclosure, the controlling of the reproduction of the video may include controlling the voices matched to the plurality of objects to be allocated to a plurality of speakers, based on locations of the plurality of objects in the video.

A computing device for matching a voice for each object included in a video, according to an embodiment of the disclosure, includes the input/output interface 220 configured to display a screen where a video is reproduced, and receive an input from a user, the memory 240 storing a program for matching an object and a voice, and the processor 230, wherein the processor 230 is configured to execute the program to separate a plurality of voices included in the video, determine dissimilarity between the plurality of voices, select a partial duration in an entire duration of the video as a matching duration, based on the dissimilarity between the plurality of voices, match the plurality of voices with a plurality of objects included in the video respectively, based on mouth movements of the plurality of objects, within the matching duration, and match the plurality of voices with the plurality of objects respectively in the entire duration of the video, based on results of the matching between the plurality of voices and the plurality of objects within the matching duration.

According to an embodiment of the disclosure, the mouth movements may include changes in lip shapes of the plurality of objects or changes in face shapes of peripheries of mouths of the plurality of objects.

According to an embodiment of the disclosure, while selecting the partial duration of the entire duration of the video as the matching duration, the processor 230 may be further configured to divide the entire duration of the video into a plurality of durations, calculate a dissimilarity value between the plurality of voices for each of the plurality of durations, and select a duration with a highest calculated dissimilarity value as the matching duration.

According to an embodiment of the disclosure, while calculating the dissimilarity value, the processor 230 may be further configured to calculate(determine) standard deviations for the plurality of voices for each of the plurality of durations, and calculate(determine) a standard deviation of the standard deviations of the plurality of voices as the dissimilarity value, for each of the plurality of durations.

According to an embodiment of the disclosure, while performing the matching within the matching duration, the processor 230 may be further configured to extract, from the matching duration, image features of the mouth movements of the plurality of objects, extract, from the matching duration, audio features of the plurality of voices, perform feature matching on the image features and the audio features, and match voices respectively corresponding to the plurality objects from among the plurality of voices, based on a result of the feature matching.

According to an embodiment of the disclosure, while performing the feature matching, the processor 230 may be further configured to measure similarity between the image features and the audio features, wherein a greater weight is assigned to the similarity in a duration where changes in the image features over time are greater, and calculate a probability that the plurality of voices correspond to the plurality of objects respectively, based on the measured similarity. In one embodiment, the processor 230 may be further configured to measure at least a first similarity and a second similarity between the image features and the audio features. A first weight is assigned to the first similarity and a second weight is assigned to the second similarity. When first changes of the image features over a first duration for the first similarity are greater than second changes of the image features over a second duration for the second similarity, the first weight is greater than the second weight.

According to an embodiment of the disclosure, while performing the feature matching, the processor 230 may be further configured to perform matching by assigning a greater weight to the image features and the audio features in a section where changes in the image features are greater, and calculate a probability that the plurality of voices correspond to the plurality objects respectively, based on a result of performing the matching. In one embodiment, the processor 230 may be further configured to perform matching by assigning a first weight to first image features and first audio features, assigning a second weight to second image features and second audio features. When first changes of the first image features in a first section are greater than second changes of the second image features, the first weight is greater than the second weight.

According to an embodiment of the disclosure, while extracting the image features of the mouth movements, the processor 230 may be further configured to extract face regions including peripheries of mouths of the plurality objects as a region of interest (ROI), and extract the image feature only from a remaining region of the ROI excluding at least a partial region of the ROI.

According to an embodiment of the disclosure, while extracting the image features only from the remaining region, the processor 230 may be further configured to extract the image features repeatedly while differently setting the at least the partial region excluded from the ROI.

According to an embodiment of the disclosure, the processor 230 may be further configured to control reproduction of the video such that the plurality of voices are output in association with the plurality of objects, based on a result of the matching in the entire duration.

According to an embodiment of the disclosure, while controlling the reproduction of the video, the processor 230 may be further configured to, when an input of selecting a first object from among the plurality of objects is received during the reproduction of the video, emphasize an output of a first voice corresponding to the first object, from among the plurality of voices.

According to an embodiment of the disclosure, the input of selecting the first object from among the plurality of objects may be in a form of zooming in or touching a region where the first object is displayed on a screen where the video is being reproduced.

According to an embodiment of the disclosure, while controlling the reproduction of the video, the processor 230 may be further configured to control the voices matched to the plurality of objects to be allocated to a plurality of speakers, based on locations of the plurality of objects in the video.

An embodiment of the disclosure may be implemented or supported by one or more computer programs, and the computer programs may be built from computer-readable program code and recorded in a computer-readable medium. In the disclosure, an "application" and a "program" may indicate one or more computer programs, a software component, an instruction set, a procedure, a function, an object, a class, an instance, related data, or some thereof, which are suitable for implementation in the computer-readable program code. The "computer-readable program code" may include various types of computer code including source code, object code, and executable code. The "computer-readable medium" may include various types of media that may be accessed by a computer, such as a read-only memory (ROM), a random access memory (RAM), a hard disc drive (HDD), a compact disc (CD), or various types of memories.

A machine-readable storage medium may be provided in the form of a non-transitory storage medium. Here, the "non-transitory storage medium" is a tangible device and may exclude wired, wireless, optical, or another communication links that transmit transitory electrical or other signals. The "non-transitory storage medium" does not distinguish a case where data is semi-permanently stored in a storage medium and a case where data is temporarily stored in the storage medium. For example, the "non-transitory storage medium" may include a buffer where data is temporarily stored. The computer-readable medium may be an arbitrary available medium accessible by a computer, and include all volatile and non-volatile media and separable and non-separable media. The computer-readable medium includes a medium where data may be permanently stored and a medium where data is stored and then overwritten later, such as a rewritable optical disc or an erasable memory device.

According to an embodiment of the disclosure, a method according to an embodiment of the disclosure in the present specification may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

The above description is provided for illustration, and it will be understood by one of ordinary skill in the art that various changes in form and details may be readily made therein without departing from essential features and the scope of the disclosure as defined by the following claims. For example, an appropriate result may be achieved even when techniques described above are performed in a different order than the described method, and/or components, such as systems, structures, devices, and circuits, are combined in a different manner than the described method, or the component is replaced or substituted by another component or equivalent. Accordingly, it should be construed that the above embodiment of the disclosure are examples only in all aspects and are not limited. For example, each component described as a single type may be implemented in a distributed manner, and similarly, components described as distributed may be implemented in a combined form.

The scope of the disclosure is indicated by the following claims rather than the detailed descriptions above, and it should be interpreted that all changes or modifications derived from the meaning and scope of the claims and equivalent concepts thereof are included in the scope of the disclosure.

What is claimed is:

1. A method comprising: separating, using one or more processors, a plurality of voices in a video; determining, using the one or more processors, a dissimilarity between the plurality of voices; selecting, using the one or more processors, a partial duration in an entire duration of the video as a matching duration, based on the dissimilarity between the plurality of voices; matching, using the one or more processors, within the matching duration, the plurality of voices with a plurality of objects in the video respectively, based on mouth movements of the plurality of objects; and matching, using the one or more processors, the plurality of voices with the plurality of objects respectively in the entire duration of the video, based on results of the matching between the plurality of voices and the plurality of objects within the matching duration.

2. The method of claim 1, wherein the mouth movements comprise at least one of changes in lip shapes of the plurality of objects or changes in face shapes of peripheries of mouths of the plurality of objects.

3. The method of claim 1, wherein the selecting, using the one or more processors, the partial duration in the entire duration of the video as the matching duration comprises: dividing the entire duration of the video into a plurality of durations; determining a dissimilarity value between the plurality of voices for each of the plurality of durations; and selecting a duration with a highest calculated dissimilarity value, among the plurality of durations, as the matching duration.

4. The method of claim 3, wherein the determining, using the one or more processors, the dissimilarity value between the plurality of voices for each of the plurality of durations comprises: determining standard deviations of the plurality of voices during each of the plurality of durations; and determining a standard deviation of the standard deviations of the plurality of voices as the dissimilarity value, for each of the plurality of durations.

5. The method of claim 1, wherein the matching, using the one or more processors, the plurality of voices with the plurality of objects in the video respectively within the matching duration comprises: extracting, from the matching duration, image features of the mouth movements of the plurality of objects; extracting, from the matching duration, audio features of the plurality of voices; performing feature matching on the image features and the audio features; and matching voices respectively corresponding to the plurality objects from among the plurality of voices, based on a result of the performing the feature matching.

6. The method of claim 5, wherein the performing, using the one or more processors, the feature matching comprises measuring at least a first similarity and a second similarity between the image features and the audio features, wherein a first weight is assigned to the first similarity and a second weight is assigned to the second similarity, first changes of the image features over a first duration for the first similarity are greater than second changes of the image features over a second duration for the second similarity, and the first weight is greater than the second weight, and determining a probability that the plurality of voices correspond to the plurality of objects respectively, based on the measured similarity.

7. The method of claim 5, wherein the performing, using the one or more processors, the feature matching comprises: performing matching by assigning a first weight to first image features and first audio features, assigning a second weight to second image features and second audio features, wherein first changes of the first image features in a first section are greater than second changes of the second image features, and the first weight is greater than the second weight, and determining a probability that the plurality of voices correspond to the plurality objects respectively, based on a result of the performing the matching.

8. The method of claim 5, wherein the extracting, using one or more processors, the image features of the mouth movements comprises: extracting, as a region of interest (ROI), face regions comprising peripheries of mounts of the plurality of object; and extracting the image features only from a remaining region of the ROI excluding at least a partial region of the ROI.

9. The method of claim 8, wherein the extracting, using the one or more processors, the image features only from the remaining region comprises extracting the image features repeatedly while differently setting the at least the partial region excluded from the ROI.

10. The method of claim 1, further comprising controlling reproduction of the video to output the plurality of voices are output in association with the plurality of objects, based on a result of the matching in the entire duration.

11. A non-transitory computer-readable recording medium having recorded thereon a program for executing the method of claim 1, on a computer.

12. A computing device comprising: an input/output interface configured to display a screen where a video is reproduced, and receive an input from a user; a memory storing instructions; and a processor configured to execute the instructions to: separate a plurality of voices in the video; determine a dissimilarity between the plurality of voices; select a partial duration in an entire duration of the video as a matching duration, based on the dissimilarity between the plurality of voices; match the plurality of voices with a plurality of objects in the video respectively, based on mouth movements of the plurality of objects, within the matching duration; and match the plurality of voices with the plurality of objects respectively in the entire duration of the video, based on results of the matching between the plurality of voices and the plurality of objects within the matching duration.

13. The computing device of claim 12, wherein the mouth movements comprise at least one of changes in lip shapes of the plurality of objects or changes in face shapes of peripheries of mouths of the plurality of objects.

14. The computing device of claim 12, wherein, while selecting the partial duration of the entire duration of the video as the matching duration, the processor is further configured to: divide the entire duration of the video into a plurality of durations; determine a dissimilarity value between the plurality of voices for each of the plurality of durations; and select a duration with a highest calculated dissimilarity value as the matching duration.

15. The computing device of claim 14, wherein, while determining the dissimilarity value, the processor is further configured to: determine standard deviations for the plurality of voices, for each of the plurality of durations, and determine a standard deviation of the standard deviations of the plurality of voices as the dissimilarity value, for each of the plurality of durations.

16. The computing device of claim 12, wherein the processor is further configured to execute the instructions to, while performing the matching within the matching duration: extract, from the matching duration, image features of the mouth movements of the plurality of objects; extract, from the matching duration, audio features of the plurality of voices; perform feature matching on the image features and the audio features; and match voices respectively corresponding to the plurality objects from among the plurality of voices, based on a result of the performing the feature matching.

17. The computing device of claim 16, wherein the processor is configured to execute the instructions to perform the feature matching by: measuring at least a first similarity and a second similarity between the image features and the audio features, wherein a first weight is assigned to the first similarity and a second weight is assigned to the second similarity, first changes of the image features over a first duration are greater than second changes of the image features over a second duration, and the first weight is greater than the second weight, and determine a probability that the plurality of voices correspond to the plurality of objects respectively, based on the measured similarity.

18. The computing device of claim 16, wherein the processor is configured to execute the instructions to perform the feature matching by: assigning a first weight to first image features and first audio features, assigning a second weight to second image features and second audio features, wherein first changes of the first image features in a first section are greater than second changes of the second image features, wherein the first weight is greater than the second weight, and determining a probability that the plurality of voices correspond to the plurality objects respectively, based on a result of the performing the matching.

19. The computing device of claim 16, wherein, based on extracting the image features of the mouth movements, the processor is further configured to: extract face regions comprising peripheries of mouths of the plurality objects as a region of interest (ROI), and extract the image feature from a remaining region of the ROI excluding at least a partial region of the ROI.

20. The computing device of claim 19, wherein, based on extracting the image features only from the remaining region, the processor is further configured to extract the image features repeatedly while differently setting the at least the partial region excluded from the ROI.

* * * * *